(12) United States Patent
Lee et al.

(10) Patent No.: US 10,560,512 B2
(45) Date of Patent: Feb. 11, 2020

(54) METHOD FOR FILE MANAGEMENT AND AN ELECTRONIC DEVICE THEREOF

(71) Applicant: Samsung Electronics Co., Ltd., Suwon-si, Gyeonggi-do (KR)

(72) Inventors: Okseon Lee, Suwon-si (KR); Yongseok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 15/150,974

(22) Filed: May 10, 2016

(65) Prior Publication Data

US 2017/0187784 A1    Jun. 29, 2017

(30) Foreign Application Priority Data

Dec. 23, 2015  (KR) .................. 10-2015-0184833

(51) Int. Cl.
| | | |
|---|---|---|
| *H04L 29/08* | (2006.01) | |
| *H04L 29/06* | (2006.01) | |
| *H04W 4/18* | (2009.01) | |
| *G06F 16/44* | (2019.01) | |
| *G06F 16/2457* | (2019.01) | |

(52) U.S. Cl.
CPC ........ *H04L 67/06* (2013.01); *G06F 16/24578* (2019.01); *G06F 16/44* (2019.01); *H04L 65/4084* (2013.01); *H04L 65/602* (2013.01); *H04W 4/18* (2013.01)

(58) Field of Classification Search
CPC ..... H04W 4/38; H04W 4/18; G06F 17/30058; G06F 17/3053; H04L 65/4084; H04L 65/602; H04L 67/10
See application file for complete search history.

(56) References Cited

U.S. PATENT DOCUMENTS

| | | | |
|---|---|---|---|
| 7,797,064 B2 | 9/2010 | Loomis et al. | |
| 7,975,062 B2* | 7/2011 | Krikorian | G11B 27/034 |
| | | | 709/231 |
| 9,201,895 B2 | 12/2015 | Robbin et al. | |
| 9,898,500 B2* | 2/2018 | Robbin | H04L 43/0876 |
| 2007/0220220 A1* | 9/2007 | Ziv | G06F 3/0605 |
| | | | 711/159 |
| 2010/0118858 A1 | 5/2010 | Pisharody | |
| 2011/0221965 A1* | 9/2011 | Mitchell | H04N 9/7921 |
| | | | 348/575 |
| 2011/0296305 A1 | 12/2011 | Orr et al. | |
| 2012/0323868 A1* | 12/2012 | Robbin | H04L 43/0876 |
| | | | 707/695 |

(Continued)

FOREIGN PATENT DOCUMENTS

| | | |
|---|---|---|
| JP | 2002-108363 A | 4/2002 |
| JP | 2005-328440 A | 11/2005 |
| WO | 2006105335 A2 | 10/2006 |

*Primary Examiner* — Jerry B Dennison
(74) *Attorney, Agent, or Firm* — Jefferson IP Law, LLP

(57) ABSTRACT

File management in an electronic device is provided. A method for operating an electronic device for file management includes transmitting a file comprising media data to an external storage, wherein the file include a part of the file and a rest of the file, deleting the rest of the file in a local storage of the electronic device, playing the media data using the stored part of the file in the local storage, and playing the media data using the rest of the file received from the external storage.

19 Claims, 25 Drawing Sheets

(56) References Cited

U.S. PATENT DOCUMENTS

| | | | |
|---|---|---|---|
| 2013/0036135 A1 | 2/2013 | Brockey et al. | |
| 2013/0085586 A1* | 4/2013 | Parekh | G11B 27/034 700/94 |
| 2013/0254314 A1 | 9/2013 | Chow | |
| 2014/0207963 A1* | 7/2014 | Kent | H04L 65/60 709/231 |
| 2015/0324379 A1* | 11/2015 | Danovitz | H04N 21/2743 707/825 |
| 2017/0171264 A1* | 6/2017 | Salomons | H04N 21/2402 |
| 2017/0187784 A1* | 6/2017 | Lee | G06F 16/24578 |

* cited by examiner

METHOD FOR FILE MANAGEMENT AND AN ELECTRONIC DEVICE THEREOF

CROSS-REFERENCE TO RELATED APPLICATION(S)

This application claims the benefit under 35 U.S.C. § 119(a) of a Korean patent application filed on Dec. 23, 2015 in the Korean Intellectual Property Office and assigned Serial number 10-2015-0184833, the entire disclosure of which is hereby incorporated by reference.

TECHNICAL FIELD

The present disclosure relates to file management in an electronic device.

BACKGROUND

Portable electronic devices such as smart phones and personal digital assistants (PDAs) have become more and more widely used and are now common accessories for most people. Further, technical developments have allowed these portable electronic devices to exhibit higher performance and accordingly, provide more services to users. More specifically, many of these portable electronic devices provide phone call services, messaging services, and various other services requiring massive amounts of data storage for associated images, audio, and video.

For portability, these portable electronic devices are limited in size and weight. Hence, these electronic devices typically include a memory of limited capacity. As a result, when using a high-quality image or a massive video service, the electronic device may lack sufficient memory for optimal operation.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide an apparatus and method for managing a file stored in an electronic device.

Another aspect of the present disclosure is to provide an apparatus and method for storing a file in an external storage in an electronic device.

Another aspect of the present disclosure is to provide an apparatus and method for fulfilling intelligent file management to secure internal storage capacity using an external storage in an electronic device.

Another aspect of the present disclosure is to provide an apparatus and method for playing a file stored in an external storage in an electronic device.

Another aspect of the present disclosure is to provide an apparatus and method for streaming a file stored in an external storage in an electronic device.

Another aspect of the present disclosure is to provide an apparatus and method for reducing a time delay of streaming a file stored in an external storage in an electronic device.

Another aspect of the present disclosure is to provide an apparatus and method for processing a file received through streaming in an electronic device.

In accordance with an aspect of the present disclosure, a method for operating an electronic device is provided. The method includes transmitting a file comprising media data to an external storage, wherein the file include a part of the file and a rest of the file, deleting the rest of the file in a local storage of the electronic device, playing the media data using the stored part of the file in the local storage, and playing the media data using the rest of the file received from the external storage.

In accordance with another aspect of the present disclosure, an electronic device is provided. The electronic device includes an internal storage for storing data, a communication unit for transmitting data, and a processor connected with the internal storage and the communication unit, wherein the processor, controls to transmit a file comprising media data to an external storage, wherein the file include a part of the file and a rest of the file, deletes the rest of the file in the internal storage, plays the media data using the stored part of the file in the internal storage, and plays the media data using the rest of the file received from the external storage.

In accordance with another aspect of the present disclosure, non-transitory computer readable recording medium is provided. The medium stores at least one instruction that when executed by a processor, configures the processor to transmit a file comprising media data to an external storage, store a part of the file in a local storage of the electronic device and delete a rest of the file excluding the stored part of the file, play the media data using the stored part of the file in the local storage, and request the rest of the file from the external storage and seamlessly continue playing the media data using the rest of the file received from the external storage.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

By the term "substantially," it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide a technique for managing a file or files in an electronic device.

Hereinafter, terms indicating data types (e.g., a file, a part, an initial portion, a chunk, and the like), a term indicating a file estimation indicator (e.g., a weighting factor and the like), terms indicating network entities (e.g., a cloud and the like), and terms indicating device components, are mentioned by way of example. Accordingly, the present disclosure is not limited to those terms and may employ other equivalent terms.

Figure 1:
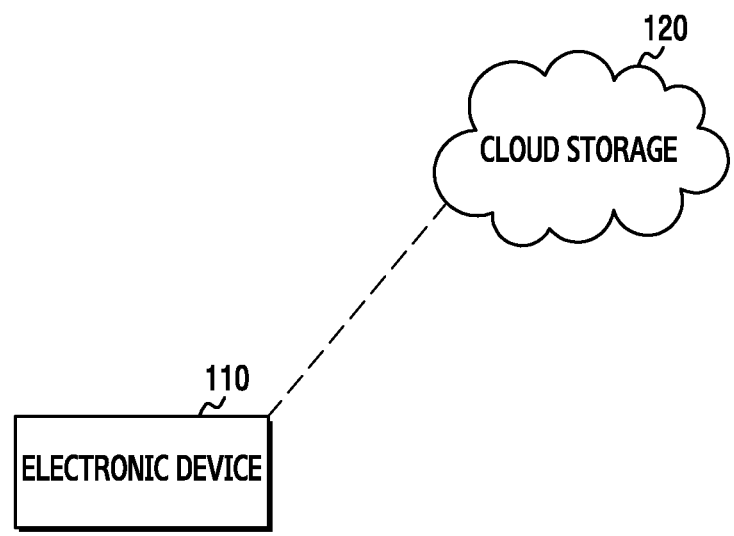
FIG. 1 illustrates an electronic device and an external storage according to an embodiment of the present disclosure.

FIG. 1 depicts an electronic device and an external storage according to an embodiment of the present disclosure.

Referring to FIG. 1, an electronic device 110 is provided and used by a user. In most cases, the electronic device 110 includes an internal storage of limited capacity. The electronic device 110 may store media contents such as images and videos in the internal storage. The electronic device 110 may have communication capability and communicate with another device using at least one radio access technology (RAT). The electronic device 110 may include one of a smart phone, potable terminal, mobile phone, mobile pad, media player, tablet computer, handheld computer, or personal digital assistant (PDA). The electronic device 110 may also combine one or more functions of those devices.

A cloud storage 120 is provided as an external storage of the electronic device 110, but embodiments are not limited thereto. The cloud storage 120 may receive and store data from the electronic device 110. The cloud storage 120 may also transmit data to the electronic device 110. The cloud storage 120 and the electronic device 110 may communicate with each other directly or over an access service network (ASN). The cloud storage 120 may be installed by the user or may be provided from a network provider, a manufacturer of the electronic device 110, or other external provider. For example, the user of the electronic device 110 may use a storage space of a certain capacity of the cloud storage 120 based on a contract with a provider of the cloud storage 120.

Figure 2:
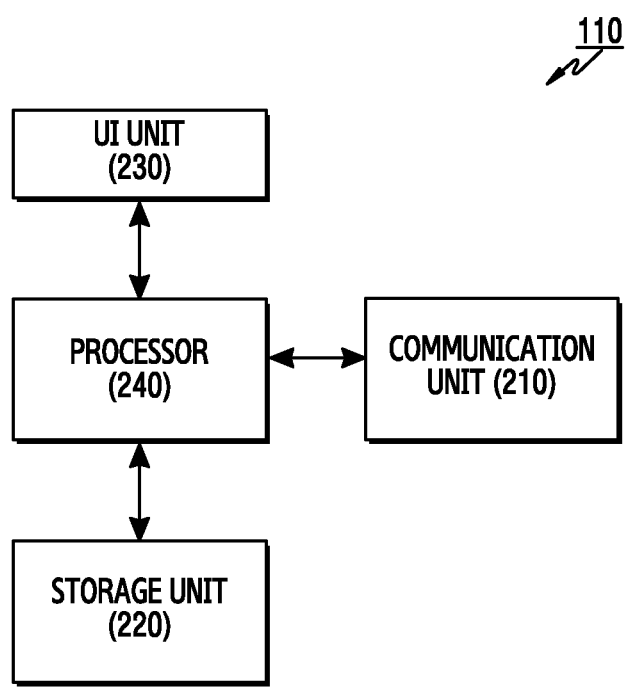
FIG. 2 illustrates an electronic device according to an embodiment of the present disclosure.

FIG. 2 depicts an electronic device according to an embodiment of the present disclosure.

Hereinafter, terms such as '~part', '~module', and '~unit', indicate an element for processing at least one function or operation, and may be realized using hardware, software, or a combination of hardware and software. FIG. 2 is a block diagram of an electronic device 110 of FIG. 1.

Referring to FIG. 2, an electronic device 110 includes a communication unit 210, a storage unit 220, a user interface (UI) unit 230, and a processor 240.

The communication unit 210 transmits and receives signals over a radio channel. For example, the communication unit 210 converts a baseband signal into a bitstream and vice versa according to a physical layer standard of the system. For the data transmission, the communication unit 210 generates complex symbols by encoding and modulating a transmit bit string. In data reception, the communication unit 210 restores the received bit string by demodulating and decoding the baseband signal. The communication unit 210 up-converts the baseband signal into a radio frequency (RF) signal, transmits the RF signal over an antenna, and down-converts an RF signal received over the antenna into a baseband signal. For example, the communication unit 210 may include a transmit filter, a receive filter, an amplifier, a mixer, an oscillator, a digital to analog converter (DAC), and an analog to digital converter (ADC).

The communication unit 210 may include a plurality of such RF chains operating together or separately. The communication unit 210 may also support various beamforming techniques. For beamforming, the communication unit 210 may adjust a phase and an amplitude of signals transmitted and received via a plurality of antennas or antenna elements. The communication unit 210 may also include a plurality of communication modules for supporting different RATs.

To process a plurality of different frequency band signals, the communication unit 210 may include a plurality of different communication modules. For example, different communication techniques may include Bluetooth low energy (BLE), Wireless Fidelity (Wi-Fi), WiFi gigabyte (WiGig), and cellular network (e.g., long term evolution (LTE)). The different frequency bands may include super high frequency (SHF) band (e.g., 2.5 GHz, 5 GHz) and millimeter (mm) wave band (e.g., 60 GHz).

The communication unit 210 transmits and receives signals as stated above. Hence, the communication unit 210 may be referred to as a transmitter, a receiver, or a transceiver. In the following description, transmission and reception over a radio channel are processed in the communication unit 210.

The storage unit 220 stores a basic program for operations of the electronic device 110, an application program, and data such as setting information. In particular, the storage unit 220 may store at least one instruction set (e.g., an application) for managing a file. The at least one instruction set stored in the storage unit 220 may be executed by the processor 240. The storage unit 220 provides the stored data according to a request of the processor 240. The storage unit 220 is included in the electronic device 110 and may be referred to as an internal storage, but embodiments are not limited thereto.

The UI unit 230 outputs information and detects a user's input. The UI unit 230 may forward a command or data input from the user to the processor 240. For doing so, the UI unit 230 may include at least one hardware module for outputting and at least one hardware module for inputting. For example, the hardware module may include at least one of a sensor, keyboard, keypad, speaker, microphone, touch screen, liquid crystal display (LCD), light emitting diode (LED), light emitting polymer display (LPD), organic light emitting diode (OLED), active matrix organic light emitting diode (AMOLED), and flexible LED (FLED). The UI unit 230 may provide the processor 240 with user touch data (e.g., tap, press, pinch, stretch, slide, swipe, rotate, and the like) input through a touch screen. The UI unit 230 may also output a command or data received from the processor 240 through an input/output device (e.g., a speaker or a display). Since the UI unit 230 displays a screen, it may be referred to as a display unit. Also, since the UI unit 230 detects a user's input, it may be referred to as an input unit.

The processor 240 controls the operations of the electronic device 110. For example, the processor 240 transmits and receives signals through the communication unit 210. The processor 240 also records and reads data to and from the storage unit 220. For doing so, the processor 240 may include at least one processor or microprocessor, or may be a part of a processor or microprocessor. The processor 240 may be referred to as an application processor (AP). The processor 240 may control various functions of the electronic device 110 to manage a file, as described in greater detail below.

Figure 3:
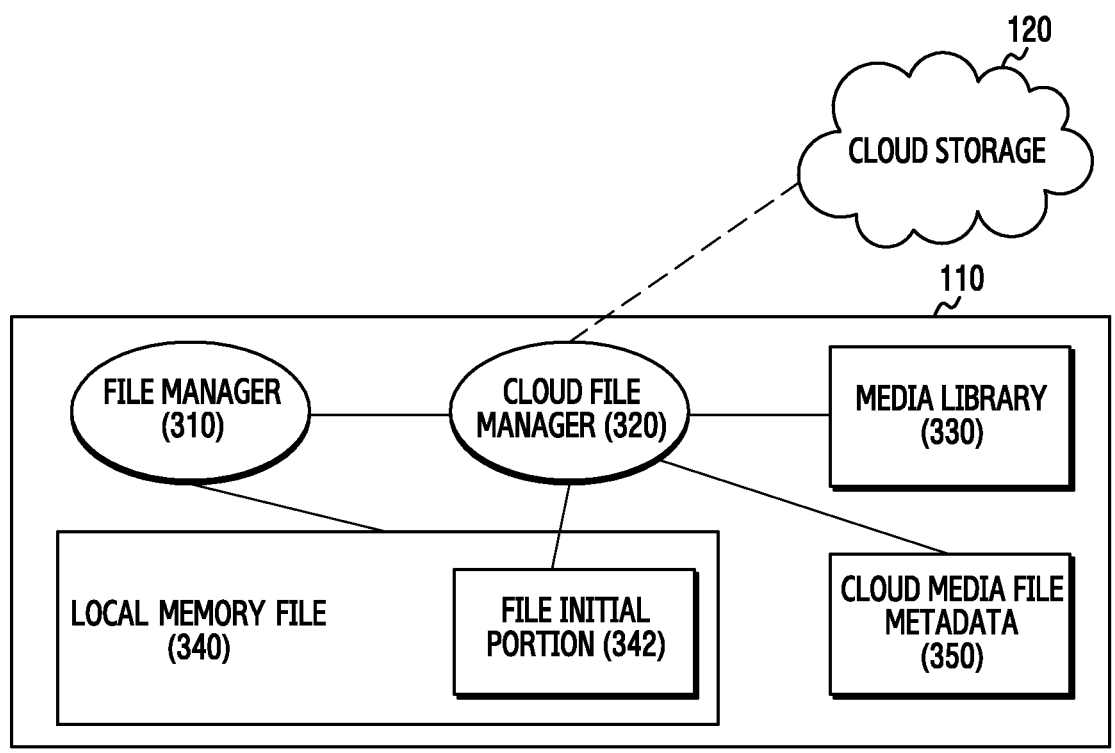
FIG. 3 illustrates a file management structure of an electronic device according to an embodiment of the present disclosure.

FIG. 3 depicts a file management structure of an electronic device according to an embodiment of the present disclosure.

Each block in FIG. 3 indicates a unit for processing at least one function or operation, and may be implemented using hardware or software alone or in combination. FIG. 3 shows a logical structure of an electronic device 110 of FIG. 1.

Referring to FIG. 3, an electronic device 110 includes a file manager 310, a cloud file manager 320, a media library 330, a local memory file 340, and cloud media file metadata 350.

The file manager 310 manages a file list and physical location information of the local memory file 340. The cloud file manager 320 manages file lists and physical location information of files stored in the cloud storage 120 and file initial portions 342 stored in the electronic device 110.

The media library 330 is a set of information about media used in the electronic device 110. For example, the media library 330 contains media file information (e.g., titles, albums, genres, and the like). The media library 330 may be accessed by the file manager 310 and the cloud file manager 320, and may manage the media file information in association with the file manager 310 and the cloud file manager 320.

The cloud media file metadata 350 is metadata of the files stored in the cloud storage 120. The cloud media file metadata 350 may be used by the cloud file manager 320. That is, the cloud media file metadata 350 may include information (e.g., uniform resource location (URL), size, duration, codec, and the like) required to stream the media file stored in the cloud storage 120.

Figure 4:
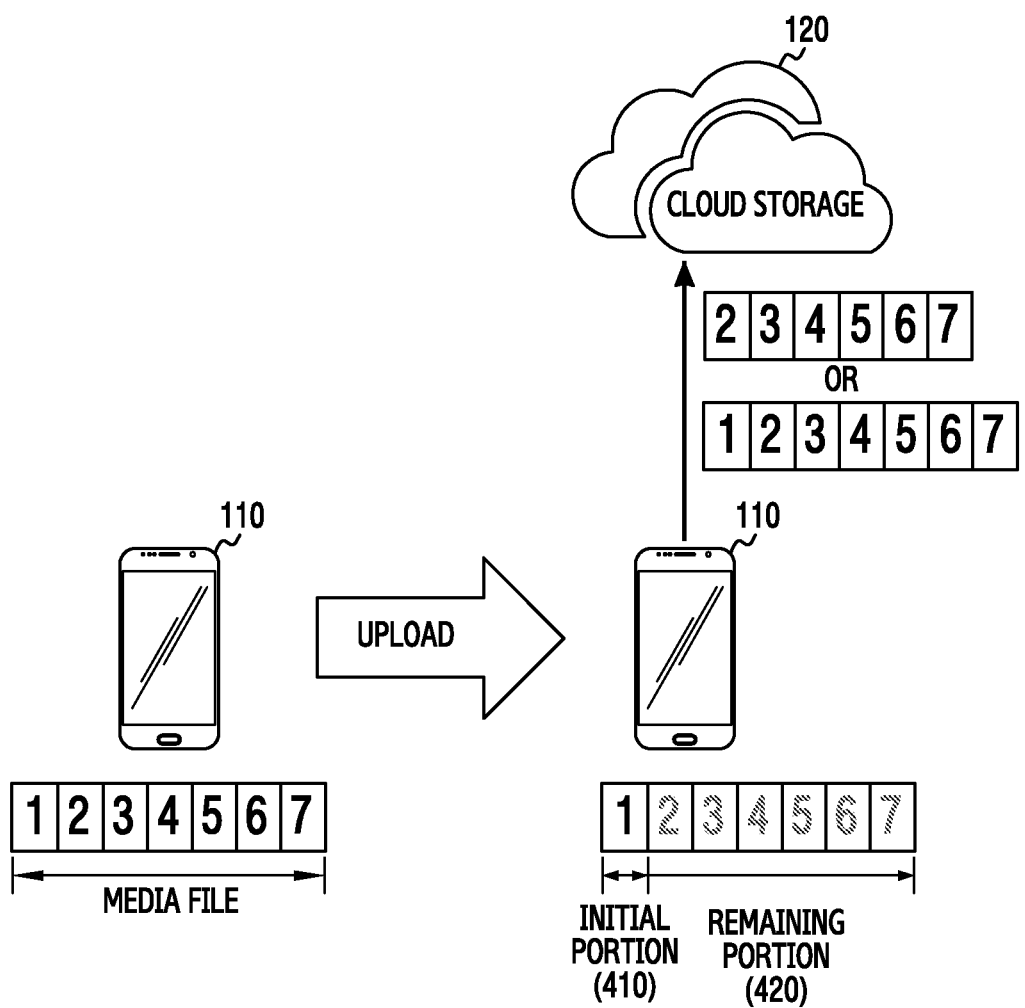
FIG. 4 illustrates file uploading of an electronic device according to an embodiment of the present disclosure.

FIG. 4 depicts file uploading of an electronic device according to an embodiment of the present disclosure.

Referring to FIG. 4, an electronic device 110 stores a media file, and the media file may include seven portions. The seven portions are chunks quantitatively divided from the media file. For example, a quantitative chunk may include data corresponding to the front portion based on a play time. The illustrated media file is segmented into the seven portions in FIG. 4 by way of example, and a media file may be segmented into six or less portions or into eight or more portions.

The electronic device 110 may upload the media file to the cloud storage 120. That is, to store the media file in the cloud storage 120 which is the external storage, the electronic device 110 may transmit some or all of the media file. The electronic device 110 may then delete the media file in order to utilize the internal storage capacity occupied by the media file. In so doing, the electronic device 110 deletes only a remaining portion 420, excluding an initial portion 410 of the media file. Accordingly, the media file transmitted to the cloud storage 120 may be the entire media file or the remaining portion 420 deleted by the electronic device 110.

As such, a part 410 of the media file is stored in the internal storage of the electronic device 110 and the rest 420 is stored in the external storage, that is, in the cloud storage 120. That is, the part 410 of the media file and the rest 420 of the media file are distributed to physically different storages. To ease the understanding, the portioned file distributed and stored in the internal storage and the external storage is hereinafter referred to as a distributively stored file.

In FIG. 4, the front or initial portion 410 includes only one portion by way of example. According to various embodiments, the front or initial portion 410 may include two or more portions. In this case, the number of the media file or remaining portions 420 transmitted to the cloud storage 120 may also change.

In FIG. 4, the media file is distributed and stored quantitatively. According to another embodiment of the present disclosure, the media file may distributed and stored qualitatively. In this case, the part of a file stored in the internal storage includes low-quality data transcoded from the media file, and the rest is uploaded to the external storage. The rest of the file uploaded to the external storage can be combined when needed with the part of the file stored in the internal storage and thus, the data may enrich the media file with higher quality. Alternatively, the part of the file stored in the internal storage may include low-quality data transcoded from the media file, and the entire media file or a remaining portion based on the play time may be uploaded to the external storage.

Figure 5:
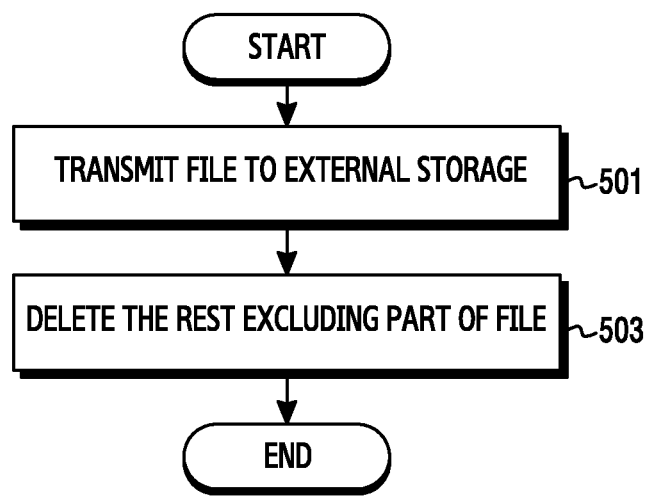
FIG. 5 is a flowchart of a file uploading method in an electronic device according to an embodiment of the present disclosure.

FIG. 5 is a flowchart of a file uploading method in an electronic device according to an embodiment of the present disclosure.

FIG. 5 illustrates operations of an electronic device 110 of FIG. 1.

Referring to FIG. 5, in operation 501, an electronic device transmits a file to an external storage. Herein, the external storage indicates a storage device physically separated from the electronic device. For example, the external storage may include a cloud storage. The file transmitted to the external storage may include an entire file or the rest of the file to be deleted in operation 503.

In operation 503, the electronic device deletes the rest of the file excluding the part of the file to be retained in the electronic device. That is, the electronic device deletes the file to secure the available capacity of the internal storage, but preserves part of the file. Herein, the part of the file retained in the electronic device is partial data enabling the electronic device to start the media playback while the rest of the file is downloaded from the external storage, and may include a qualitative or quantitative part of the data of the file. The quantitative part of the file includes data corresponding to a partial section (e.g., an initial portion) in the play time. The qualitative part of the file may include low-quality data corresponding to the entire play time. Alternatively, the part of the file retained in the electronic device may include low-quality data of some section in the play time.

Figure 6:
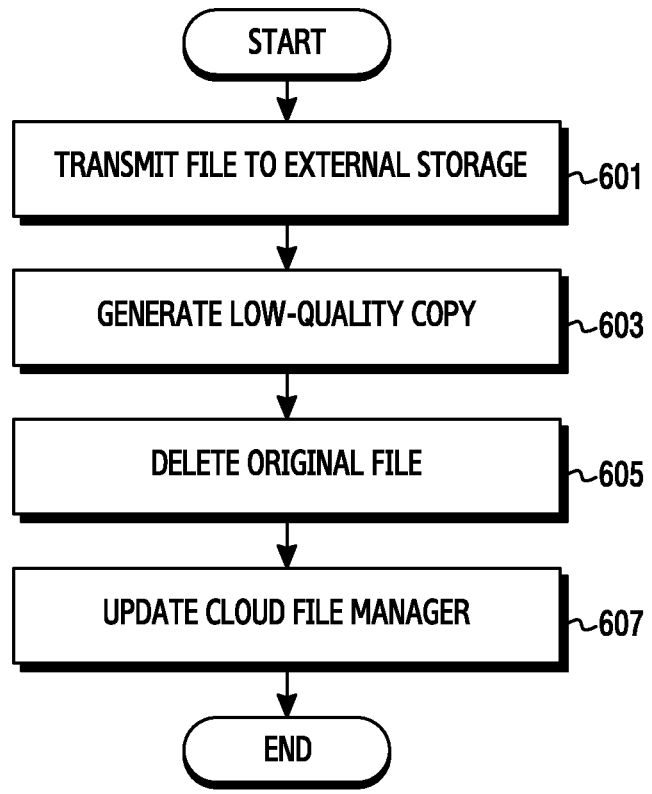
FIG. 6 is a flowchart of a file uploading method for preserving a qualitative part of a file in an electronic device according to an embodiment of the present disclosure.

FIG. 6 is a flowchart of a file uploading method for preserving a qualitative part of a file in an electronic device according to an embodiment of the present disclosure.

FIG. 6 illustrates operations of an electronic device 110 of FIG. 1.

Referring to FIG. 6, in operation 601, the electronic device transmits a file to an external storage. Herein, the external storage indicates a storage device physically separated from the electronic device. For example, the external storage may include a cloud storage. The file transmitted to the external storage may include an entire file, a remaining portion of the file based on the play time, or supplemental data for enhancing quality of a low-quality copy generated in operation 603.

In operation 603, the electronic device generates the low-quality copy. For example, the electronic device generates a copy of lower quality than the original file using transcoding. Herein, low quality indicates at least one of a low resolution, a data rate per low unit time (e.g., kbps), and a number of frames per low unit time.

In operation 605, the electronic device deletes the original file. That is, to increase the available capacity of the internal storage of the electronic device, the electronic device preserves the low-quality copy and deletes the original file. Hence, the electronic device may increase available capacity by as much as a difference between the original file capacity and the copy capacity.

In operation 607, the electronic device updates the cloud file manager. The cloud file manager manages information about the file of which part is stored in the internal storage and the rest is stored in the external storage, that is, metadata. Since the distributively stored file is generated in operations 601 and 603, the electronic device stores the information of the distributively stored file.

Figure 7:
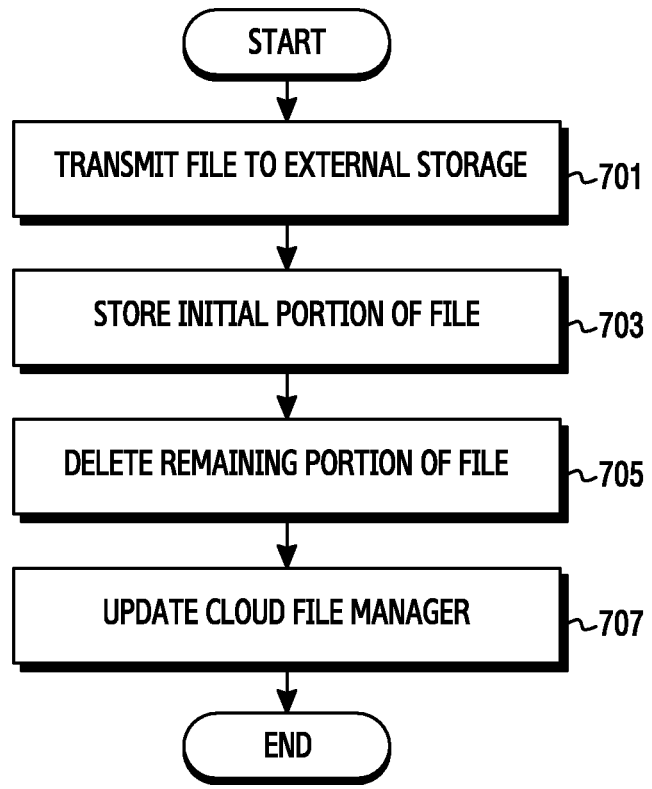
FIG. 7 is a flowchart of a file uploading method for preserving a quantitative part of a file in an electronic device according to an embodiment of the present disclosure.

FIG. 7 is a flowchart of a file uploading method for preserving a quantitative part of a file in an electronic device according to an embodiment of the present disclosure.

FIG. 7 illustrates operations of an electronic device 110 of FIG. 1.

Referring to FIG. 7, in operation 701, the electronic device transmits a file to an external storage. Herein, the external storage indicates a storage device physically separated from the electronic device. For example, the external storage may include a cloud storage. The file transmitted to the external storage may include an entire file or a remaining portion excluding the initial portion of the file stored in operation 703.

In operation 703, the electronic device stores the initial portion of the file at the electronic device. For example, the electronic device extracts data corresponding to the front portion of the file play time, from the file. For storing, the electronic device may add supplemental data for terminating the file, to the data corresponding to the front portion of the file play time. That is, the electronic device can store independent data corresponding to the front portion of the file play time. Alternatively, the electronic device may store data in the form of a truncated file without the supplemental data.

In operation 705, the electronic device deletes the remaining portion of the file. That is, the electronic device deletes the remaining portion excluding the stored initial portion in order to increase the available capacity of the internal storage. Hence, the electronic device may increase available capacity by as much as the difference between the entire file capacity and the data capacity for the front portion.

In operation 707, the electronic device updates the cloud file manager. The cloud file manager manages information about the file of which part is stored in the internal storage and the rest is stored in the external storage, that is, metadata. Since the distributively stored file is generated in operations 701 and 703, the electronic device stores the information of the distributively stored file.

Figure 8:
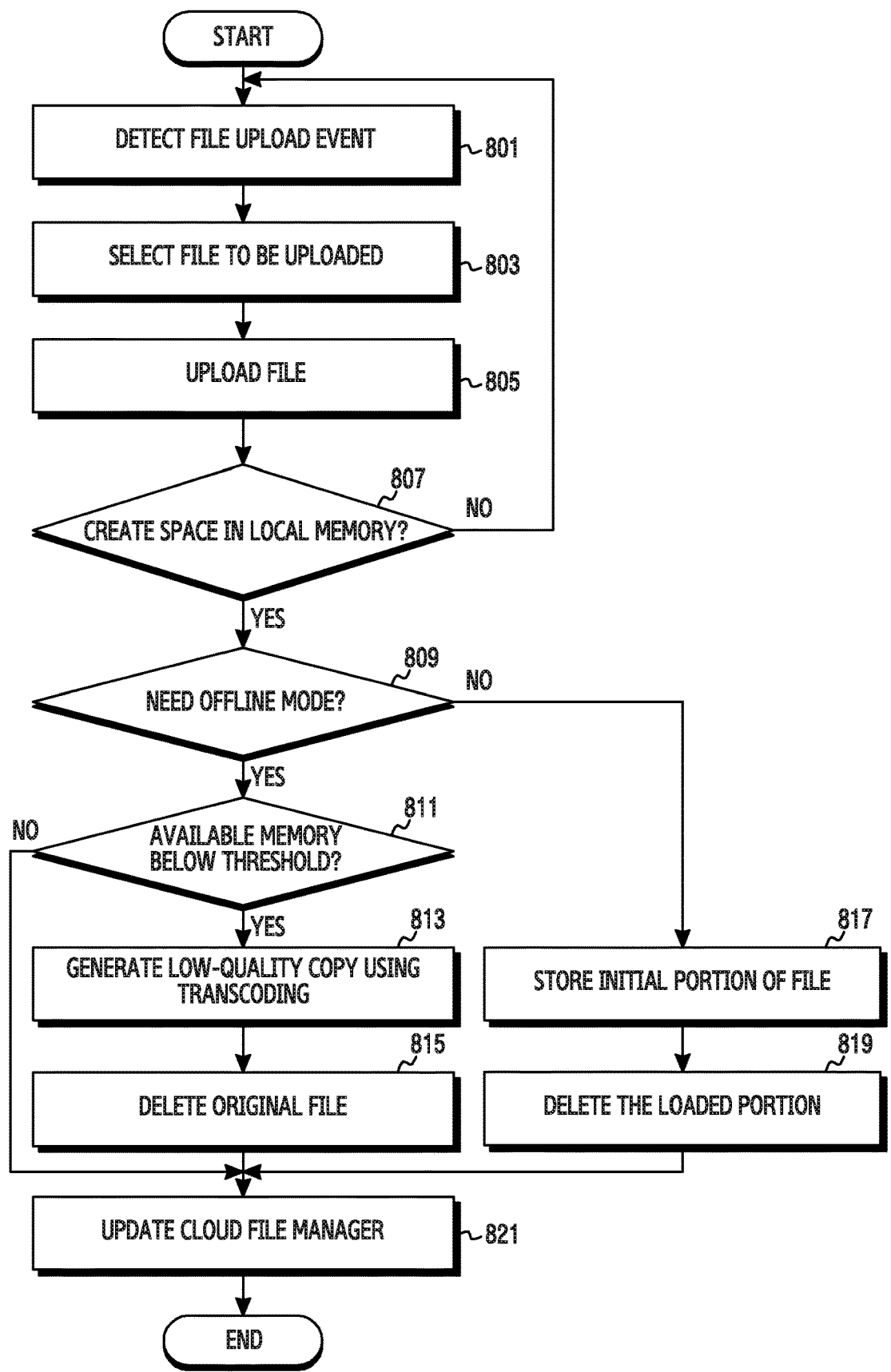
FIG. 8 is a flowchart of a file uploading method for selectively preserving qualitative and quantitative parts of a file in an electronic device according to an embodiment of the present disclosure.

FIG. 8 is a flowchart of a file uploading method for selectively preserving quantitative and qualitative parts of a file in an electronic device according to an embodiment of the present disclosure.

FIG. 8 illustrates operations of an electronic device 110 of FIG. 1.

Referring to FIG. 8, in operation 801, the electronic device detects a file upload event. That is, in response to an event predefined by a user or a system, the electronic device uploads the file to the external storage. The event may be related to a communication state, a battery state, a memory state, and user data, but embodiments are not limited thereto. For example, the event may be defined as a free Internet connection, a battery charging of the electronic device, where a remaining capacity of the internal storage, that is, the local memory, has fallen below a threshold, at least one of a different movement pattern from past statistics of user location information and local memory capacity occupied for media creation (e.g., video recording, audio creation, and image capturing), video or photo shooting expected during a travel, new media file storing (e.g., audio, video file purchase and creation) in the internal storage, or arrival of a travel start scheduled in a user's calendar or scheduler or arrival of timing before or after a certain time. In other embodiments, the event may be defined differently.

In operation 803, the electronic device selects a file to be uploaded. The file to upload may be selected by user selection or based on a predefined criterion. Based on the predefined criterion, the electronic device may select the file to upload based on the capacity and storing timing of files stored in the internal storage. For example, the electronic device may first select massive media, may select the largest file or alternatively, may select the first stored file among files exceeding a threshold size.

In operation 805, the electronic device uploads the file. That is, the electronic device transmits the file to the external storage (e.g., the cloud storage). In so doing, the transmitted data may include the entire file, the data for enriching the low-quality copy, or the remaining portion of the file.

In operation 807, the electronic device determines whether to create a space in the local memory, that is, the internal memory. The electronic device determines whether to increase the available capacity of the internal storage by storing the part of the uploaded file in operation 805, and deleting the rest of the file. The electronic device may determine whether to create the space based on the available capacity of the internal memory. When no space is needed, the electronic device returns to operation 801. When requiring the space, the electronic device proceeds to operation 809.

In operation 809, the electronic device determines whether to enter an offline mode. The offline mode enables the media playback without the network connection. That is, the electronic device determines whether to support the offline mode for the uploaded file. The electronic device may determine whether to support the offline mode based on user's selection, file setting, system setting, and by satisfying a predefined condition. According to the user's selection, the electronic device may output an interface asking whether to support the offline mode. According to the predefined condition, when a network access time falls below a certain rate in the user's media play time, the electronic device may determine that the offline mode is necessary. When the offline mode is required, the electronic device proceeds to operation 811. When no offline mode is required, the electronic device proceeds to operation 817.

In operation 811, the electronic device determines whether the available memory capacity falls below a threshold. That is, the electronic device determines whether the available capacity of the internal storage is below a threshold. When the available memory capacity is below the threshold, the electronic device proceeds to operation 813. When the available memory capacity exceeds or equals the threshold, the electronic device proceeds to operation 821.

In operation 813, the electronic device generates a low-quality copy using transcoding. That is, the electronic device generates a copy of lower quality than the uploaded file. Herein, low quality indicates at least one of a low resolution, a data rate per low unit time (e.g., kbps), and a number of frames per low unit time. Hence, even when the network is inaccessible in future, the electronic device may play the media. Although the low-quality copy is stored, when the external storage is accessible for the playback, the electronic device may download the original file and play the media of relatively higher quality.

In operation 815, the electronic device deletes the original file. That is, to increase the available capacity of the internal storage, the electronic device preserves the low-quality copy and deletes the original file. Hence, the electronic device may increase available capacity by as much as the difference between the original file capacity and the copy capacity.

In operation 817, the electronic device stores the initial portion of the file. For example, the electronic device extracts data corresponding to the front portion of the file play time, from the file. Hence, the electronic device may commence the media playback using the stored initial portion, download the remaining portion from the external storage during the playback of the initial portion, and thus seamlessly play the media.

In operation 819, the electronic device deletes the loaded portion of the file. That is, to increase the available capacity of the internal storage, the electronic device deletes the remaining portion excluding the stored initial portion. Hence, the electronic device may increase available capacity by as much as a difference between the entire file capacity and the data capacity for the initial portion.

After operation 811, 815, or 819, the electronic device updates the cloud file manager in operation 821. The cloud file manager manages information about the file of which part is stored in the internal storage and the rest is stored in the external storage, that is, metadata. Since the distributively stored file is generated as above, the electronic device stores information of the distributively stored file. The distributively stored file information may include information for download and seamless playback (e.g., information about a portion to be downloaded from the external storage and a connection point). Further, the electronic device may update the uploaded media file information in the media file library.

In FIG. 8, when the offline mode is required, the electronic device stores the low-quality copy and deletes or preserves the original file depending on the available memory capacity. In various embodiments, the electronic device may store only the initial portion or preserve the original file according to the available memory capacity though the offline mode is unnecessary.

In FIG. 8, a file upload failure is not considered. However, a file upload may fail due to lack of external storage capacity. In this case, the electronic device may report the upload failure to the user and abort the uploading.

As such, the electronic device may secure the available capacity of the internal storage through the intelligent file management. In so doing, by preserving the part (e.g., the initial portion or the low-quality copy) of the file in the internal storage of the electronic device, the electronic device may prevent a play start delay in the future. The uploaded file may then be played as shown in FIG. 9.

Figure 9:
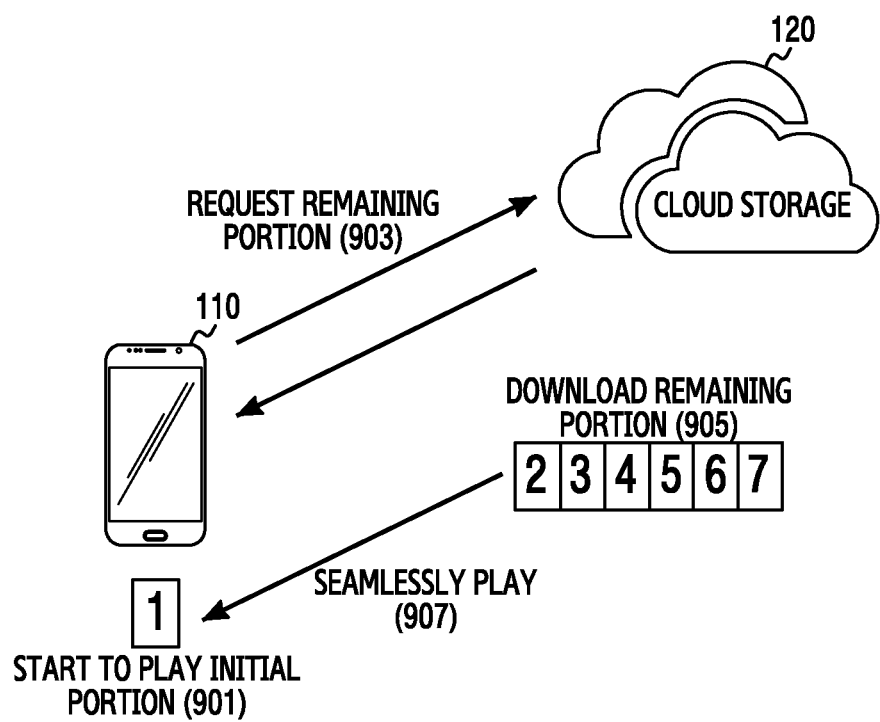
FIG. 9 illustrates playback of an uploaded file in an electronic device according to an embodiment of the present disclosure.

FIG. 9 depicts playback of an uploaded file in an electronic device according to an embodiment of the present disclosure.

In FIG. 9, a quantitative part of a file is stored in the internal storage of the electronic device as described above.

Referring to FIG. 9, in operation 901, an electronic device 110 plays an initial portion of the file stored in the internal storage of the electronic device. In operation 903, the electronic device 110 requests a remaining portion of the file from the cloud storage 120. In operation 905, the electronic device 110 downloads the remaining portion. The operations 903 and 905 are conducted during the playback of the initial portion. In operation 907, the electronic device 110 plays the downloaded remaining portion following the initial portion.

In FIG. 9, the file is played when the quantitative part of the file is stored at the electronic device. However, even when a qualitative part of the file is stored in the electronic device, the file may be played in a similar manner. A file playback is now explained based on structures of the entire file and the stored part of the file.

Figure 10:
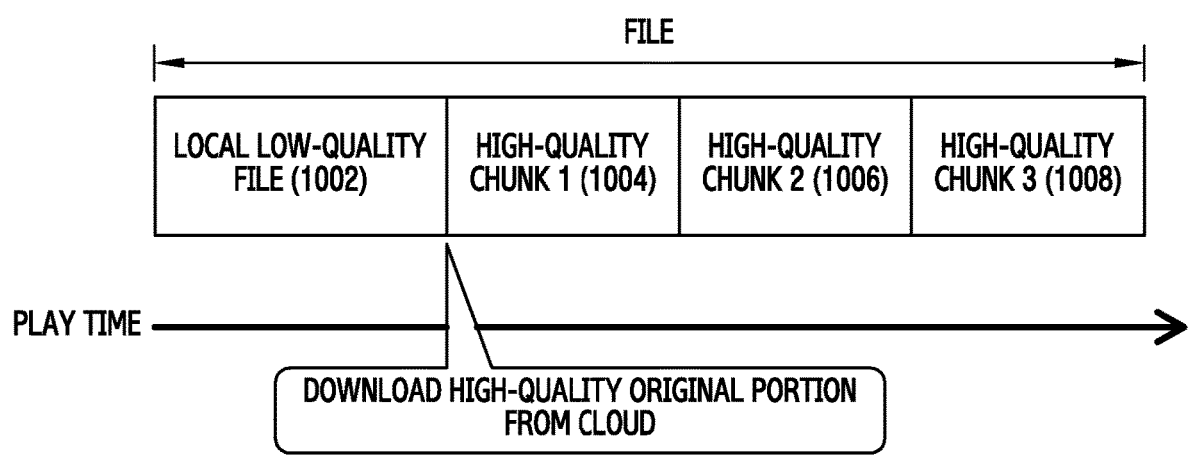
FIG. 10 illustrates file playback when a qualitative part of a file is stored in an electronic device according to an embodiment of the present disclosure.

FIG. 10 depicts file playback when a qualitative part of a file is stored in an electronic device according to an embodiment of the present disclosure.

Referring to FIG. 10, initially, when the playback commences, a local low-quality file 1002 is played. In so doing, the electronic device checks a network connection. When the network is unconnected, the electronic device continues the low-quality file playback and periodically checks the network condition during the file playback. When the network is connected, the electronic device downloads a high-quality original file from the cloud storage.

In so doing, the electronic device determines a size of a first high-quality chunk 1004 to download first, based on a buffering time predefined or determined based on the network condition. The size may be determined based on the play time, and represented as a product of a bit rate and a time (e.g., N seconds) of the original file. Hence, the electronic device downloads and plays the first high-quality chunk 1004.

During the playback of the first high-quality chunk 1004, the electronic device downloads a second high-quality chunk 1006. Similarly, during the playback of the second high-quality chunk 1006, the electronic device downloads a third high-quality chunk 1008, and so forth. The electronic device may also download a plurality of high-quality chunks at the same time in parallel using multi-sessions. When the second high-quality chunk 1006 is not completely downloaded during the playback of the first high-quality chunk 1004, the electronic device may play a corresponding time period using the local low-quality file.

Figure 11:
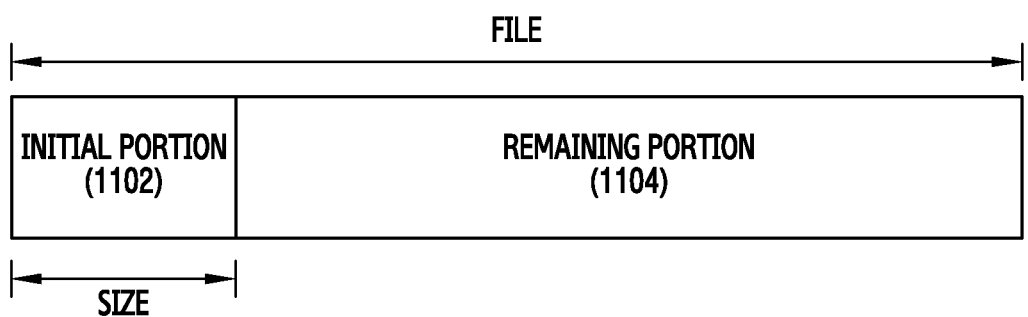
FIG. 11 illustrates file playback when a quantitative part of a file is stored in an electronic device according to an embodiment of the present disclosure.

FIG. 11 depicts file playback when a quantitative part of a file is stored in an electronic device according to an embodiment of the present disclosure.

Referring to FIG. 11, initially, when playback commences, the electronic device plays an initial portion 1102. During the playback of the initial portion 1102, the electronic device downloads a remaining portion 1104. After completely playing the initial portion 1102, the electronic device seamlessly plays the remaining portion 1104. Herein, the initial portion 1102 is pre-stored in the electronic device, and a size of the initial portion 1102 may be determined based on a time required to download the remaining portion 1104. The size of the initial portion 1102 may be determined when the file is uploaded. For example, in the file uploading, the electronic device may calculate a size of the initial portion 1102 required to play during the time (e.g., N seconds) for downloading the remaining portion 1104 using information extracted from a header of a media file. The size may be expressed as {bit rate of media file×time required to download (e.g., N seconds)} or {media file size/play time× time required to download (e.g., N seconds)}.

Figure 12:
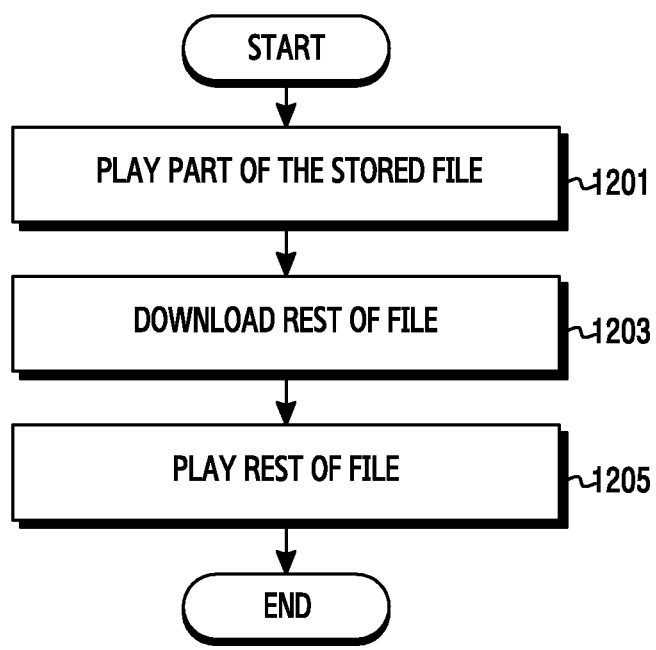
FIG. 12 is a flowchart of a method for playing an uploaded file in an electronic device according to an embodiment of the present disclosure.

FIG. 12 is a flowchart of a method for playing an uploaded file in an electronic device according to an embodiment of the present disclosure.

FIG. 12 illustrates operations of an electronic device 110 of FIG. 1.

Referring to FIG. 12, in operation 1201, the electronic device plays a part of a stored file. The part of the file is stored in the internal storage of the electronic device and may include a qualitative or quantitative part of the file. When the qualitative part of the file is stored, media may be played with a lower quality than the original file.

In operation 1203, the electronic device downloads the rest of the file. For example, the electronic device requests the file download from the external storage and receives the rest or the entire file from the external storage. Although shown sequentially arranged in FIG. 12 for illustration purposes, operation 1203 is performed in or substantially during the operation 1201. The rest of the file may be downloaded by stages or all at once. More specifically, the electronic device may download a first portion of the rest of the file, and then download a second portion of the rest of the file while the first portion is played, and so forth.

In operation 1205, the electronic device plays the rest of the file. That is, the electronic device plays the rest of the file downloaded while the part of the file stored in the internal storage is played, immediately following the playback end of the part of the file. That is, the electronic device combines the part of the file stored in the internal storage with the rest of the file stored in the external storage, and plays the file as if one single stored file is being played.

As such, the initial portion of the file is preserved in the internal storage of the electronic device and thus, the start delay in the playback may be reduced. A duration of the initial portion of the file should be determined so as to continue the playback until the remaining portion is completely downloaded. The duration of the initial portion of the file may be determined when the file is uploaded. However, the duration determined in the file upload may not always guarantee the download time of the remaining portion. Thus, the duration of the initial portion may be adjusted according to a failure of the seamless play.

Figure 13:
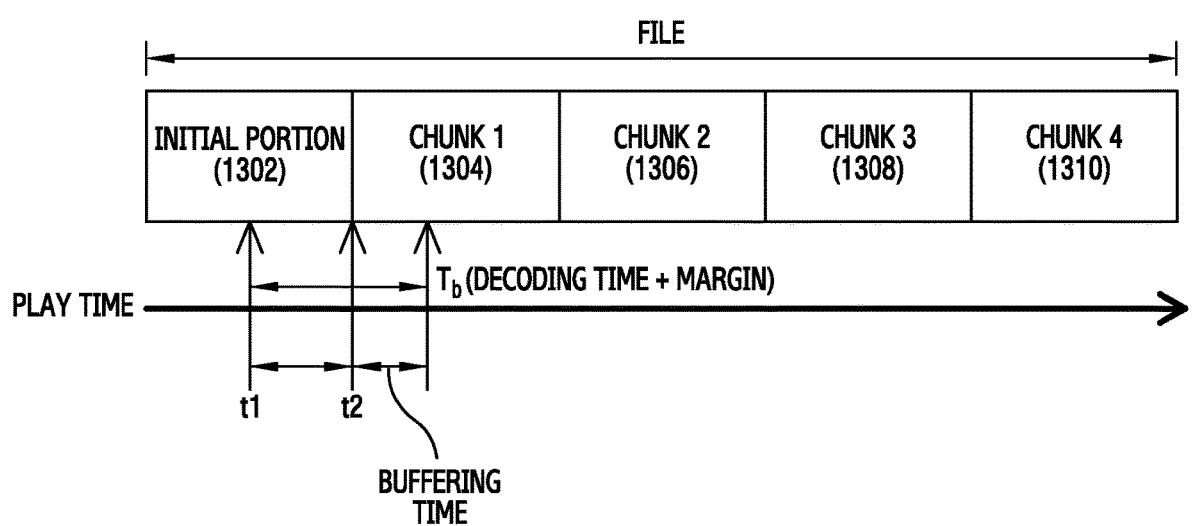
FIG. 13 illustrates a duration of an initial portion of a file required in an electronic device according to an embodiment of the present disclosure.

FIG. 13 depicts a duration of an initial portion of a file required in an electronic device according to an embodiment of the present disclosure.

Referring to FIG. 13, an entire file includes an initial portion 1302, a first chunk 1304, a second chunk 1306, a third chunk 1308, and a fourth chunk 1310. When streaming is requested, the file is played using the initial portion 1302 stored in the electronic device. While playing the initial portion 1302, the electronic device downloads and seamlessly plays the first chunk 1304. Since the first chunk 1304, second chunk 1306, third chunk 1308, and fourth chunk 1310 are downloaded to the electronic device at least once in the streaming playback, the electronic device may re-determine the duration of the initial portion to preserve without having to delete them.

When the first chunk 1304 is not completely downloaded before the playback of the initial portion 1302 is finished, the electronic device may adjust the duration of the initial portion 1302 for the seamless playback in the future. That is, when a time required to finish downloading a next portion to play exceeds a certain level while a part of the file stored in the local storage is played, the electronic device may adjust the duration of the initial portion 1302.

Referring to FIG. 13, t1 indicates a download completion time of the first chunk 1304, t2 indicates a playback completion time of the initial portion 1302, and Tb indicates a sum of the time required to decode the downloaded first chunk 1304 and a margin. Accordingly, to provide the seamless playback, {t2−t1} should be greater than or equal to Tb. When {t2−t1} falls below Tb more than a preset number of times (e.g., Nt times), the electronic device may adjust the duration of the initial portion 1302. That is, once the streaming is completed, the entire file is downloaded. Accordingly, when organizing a cache memory, the electronic device may adjust the duration of the initial portion 1302.

According to another embodiment, the electronic device may adjust the duration of the initial portion 1302 based on the internal storage capacity. For example, when the available capacity of the internal storage is below a threshold, the electronic device may reduce the duration of the initial portion 1302. For example, when a total capacity of initial portions of files is smaller than a threshold, the electronic device may increase the duration of the initial portion 1302. When not securing the available capacity of the internal storage even by reducing the duration of the initial portion 1302, the electronic device may keep the duration but reduce the size of the initial portion 1302 by transcoding the initial portion 1302 to low-quality data.

Figure 14:
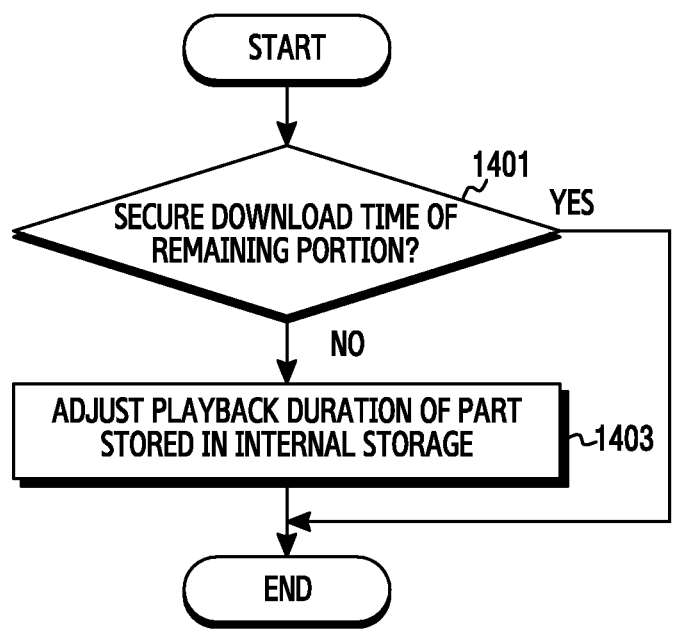
FIG. 14 is a flowchart of a method for adjusting a duration of a part of a file stored in an internal storage of an electronic device according to an embodiment of the present disclosure.

FIG. 14 is a flowchart of a method for adjusting a duration of a part of a file stored in an internal storage of an electronic device according to an embodiment of the present disclosure.

FIG. 14 illustrates operations of an electronic device 110 of FIG. 1.

Referring to FIG. 14, in operation 1401, the electronic device determines whether a download time of a remaining portion is secured. That is, the electronic device commences the file playback using an initial portion stored in the internal storage and downloads at least part of the remaining portion during the playback of the initial portion. In so doing, the electronic device determines whether a next portion is completely downloaded to enable the seamless playback immediately after the initial portion is completely played. The download time enabling the seamless playback may be determined by considering a decoding time of the next portion. For example, the download time enabling the seamless playback may be equal to or less than a time for the decoding of the next portion after the play completion time of the initial portion.

When the download time of the remaining portion is not secured, the electronic device adjusts a play duration of the part of the file stored in the internal storage, that is, the initial portion in operation 1403. That is, when the play time using the part of the file is shorter than the time required to play the rest in succession, the electronic device adjusts the duration of the part of the file. For example, the electronic device increases the duration of the initial portion. More specifically, when completing the playback, the electronic device preserves data corresponding to a longer duration than the initial portion before the playback, as the initial portion, and deletes the rest.

In the above embodiments, the electronic device plays the file uploaded to the external storage. However, a file uploaded by another device, rather than the electronic device, may also be played. When a new file uploaded by another device is played, after the user selects the file, the playback start may be delayed due to location information (e.g., URL) acquisition, connection establishment, streaming request, and metadata reception. Thus, the present disclosure provides a new file playback method for reducing the play start delay.

Figure 15:
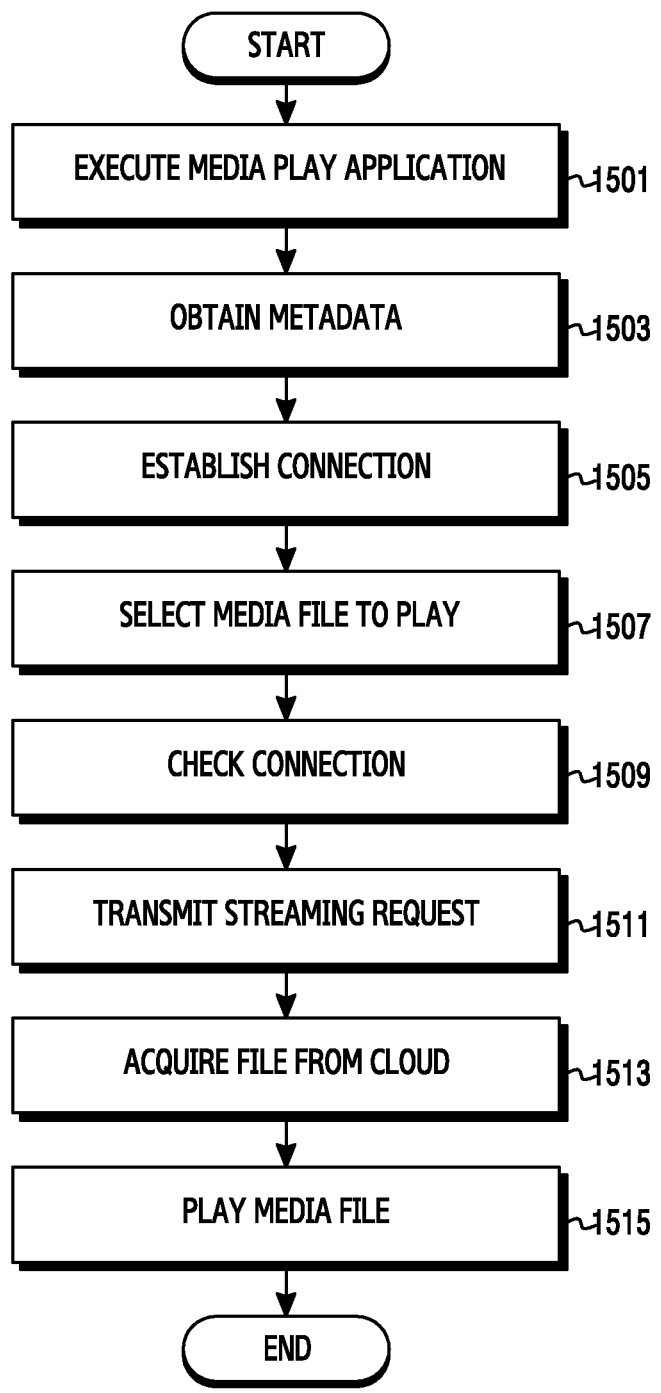
FIG. 15 is a flowchart of a method for playing a file stored in an external storage in an electronic device according to an embodiment of the present disclosure.

FIG. 15 is a flowchart of a method for playing a file stored in an external storage in an electronic device according to an embodiment of the present disclosure.

FIG. 15 illustrates operations of an electronic device 110 of FIG. 1.

Referring to FIG. 15, the electronic device executes a media play application in operation 1501. The media play application is a program for playing media files stored in the internal storage and media files stored in the external storage. The media play application may be executed by a user's command, but embodiments are not limited thereto.

In operation 1503, the electronic device obtains metadata of at least one file stored in the external storage. That is, the electronic device pre-fetches the metadata. For example, the electronic device may request and receive the metadata when accessing the external storage. More specifically, the electronic device may receive the metadata after user's login. The metadata may include location information (e.g., URL) size, and duration of at least one file stored in the external storage. That is, the metadata pre-fetching may shorten the play start time by omitting the URL acquisition after the streaming request and lessen the time for processing necessary information in the streaming after the size and duration information is obtained. In addition, one chunk size to download in the streaming may calculated based on the bit rate calculation.

In operation 1505, the electronic device establishes connection. Typically, the electronic device establishes the connection for the downloading after a file to download is selected. However, the electronic device establishes the connection before the file is selected. That is, the electronic device pre-processes the connection establishment for socket connection. In so doing, the electronic device may exchange authentication information (e.g., a security key) with the external storage.

In operation 1507, the electronic device selects a media file to play. The media file to play is selected by a user's command. That is, the electronic device may display a list of files stored in the external storage and the internal storage, and receive the user's selection. In so doing, it is assumed that a file stored in the external storage is selected.

In operation 1509, the electronic device checks the connection. For doing so, the electronic device may transmit the security key to the external storage. That is, the electronic device may exchange the security key with the external storage through a hypertext transfer protocol (HTTP) handshake. When successfully exchanging the security key, the electronic device may confirm the connection.

In operation 1511, the electronic device transmits a streaming request. That is, the electronic device transmits a message including the location information (e.g., URL) of the selected file to the external storage.

In operation 1513, the electronic device acquires the file from the cloud, that is, the external storage. That is, the electronic device may receive the media file indicated by the streaming request from the external storage.

In operation 1515, the electronic device plays the media file. The electronic device may concurrently download and seamlessly play the media file or media file chunks. That is, the electronic device decodes the media file and outputs the decoded media through a user interface.

As such, the electronic device may play the new file uploaded by another device. The file uploading by another device is shown in FIG. 16.

Figure 16:
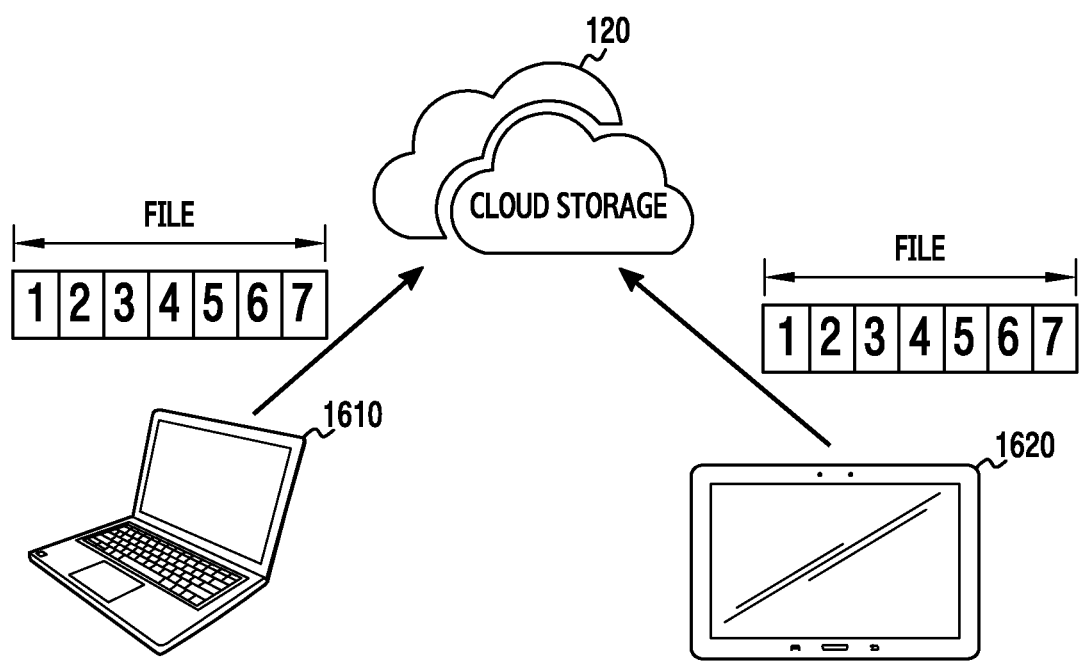
FIG. 16 illustrates a file uploaded by another device according to an embodiment of the present disclosure.

FIG. 16 depicts a file uploaded by another device according to an embodiment of the present disclosure.

Referring to FIG. 16, a device 1610 and a device 1620 may upload files to cloud storage 120. Hence, either electronic device may stream the files uploaded by the devices 1610 or the device 1620 as shown in FIG. 15.

The electronic device may store part of the file downloaded using the streaming service, for replay in the future. The part of the streaming file may be stored as shown in FIG. 17.

Figure 17:
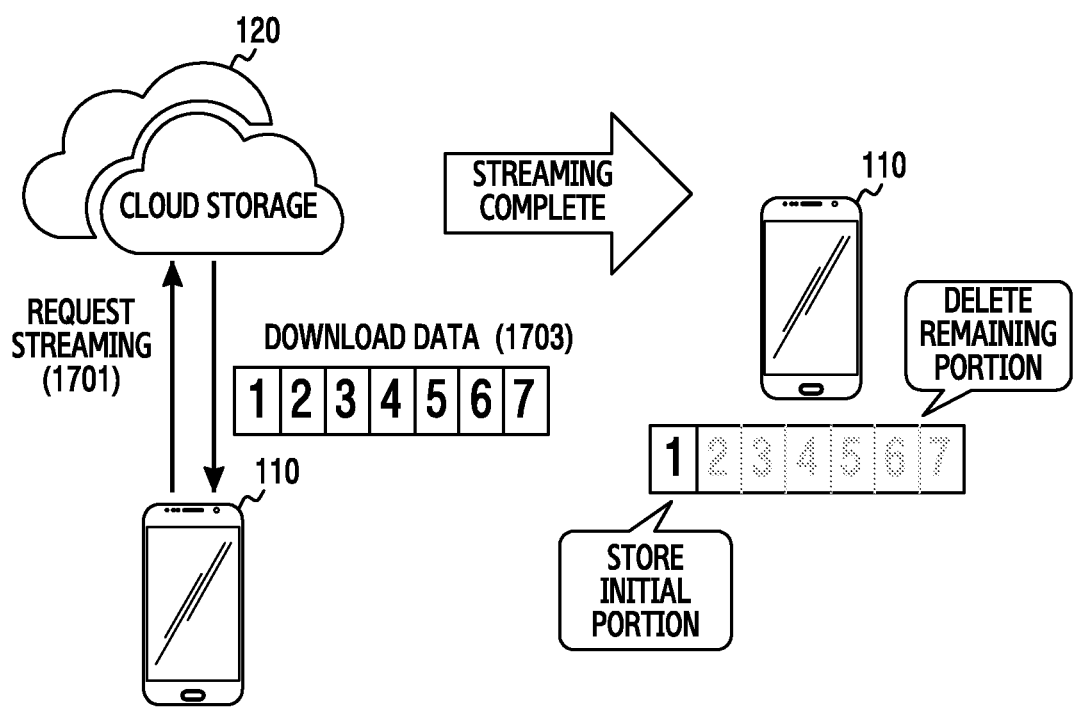
FIG. 17 illustrates a part of a file stored after streaming in an electronic device according to an embodiment of the present disclosure.

FIG. 17 depicts part of a file stored after streaming in an electronic device according to an embodiment of the present disclosure.

Referring to FIG. 17, an electronic device 110 transmits a streaming request to cloud storage 120 in operation 1701. In operation 1703, the electronic device 110 downloads data. After completing the streaming, the electronic device 110 stores an initial portion and deletes a remaining portion of the downloaded file for the streaming. Part of the file is stored after the streaming as shown in FIG. 18 or FIG. 19.

Figure 18:
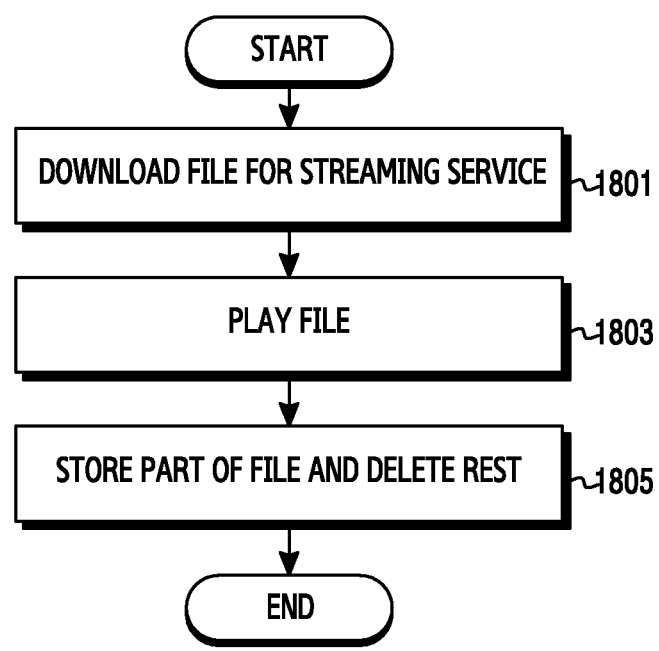
FIG. 18 is a flowchart of a method for processing a streamed file in an electronic device according to an embodiment of the present disclosure.
Figure 19:
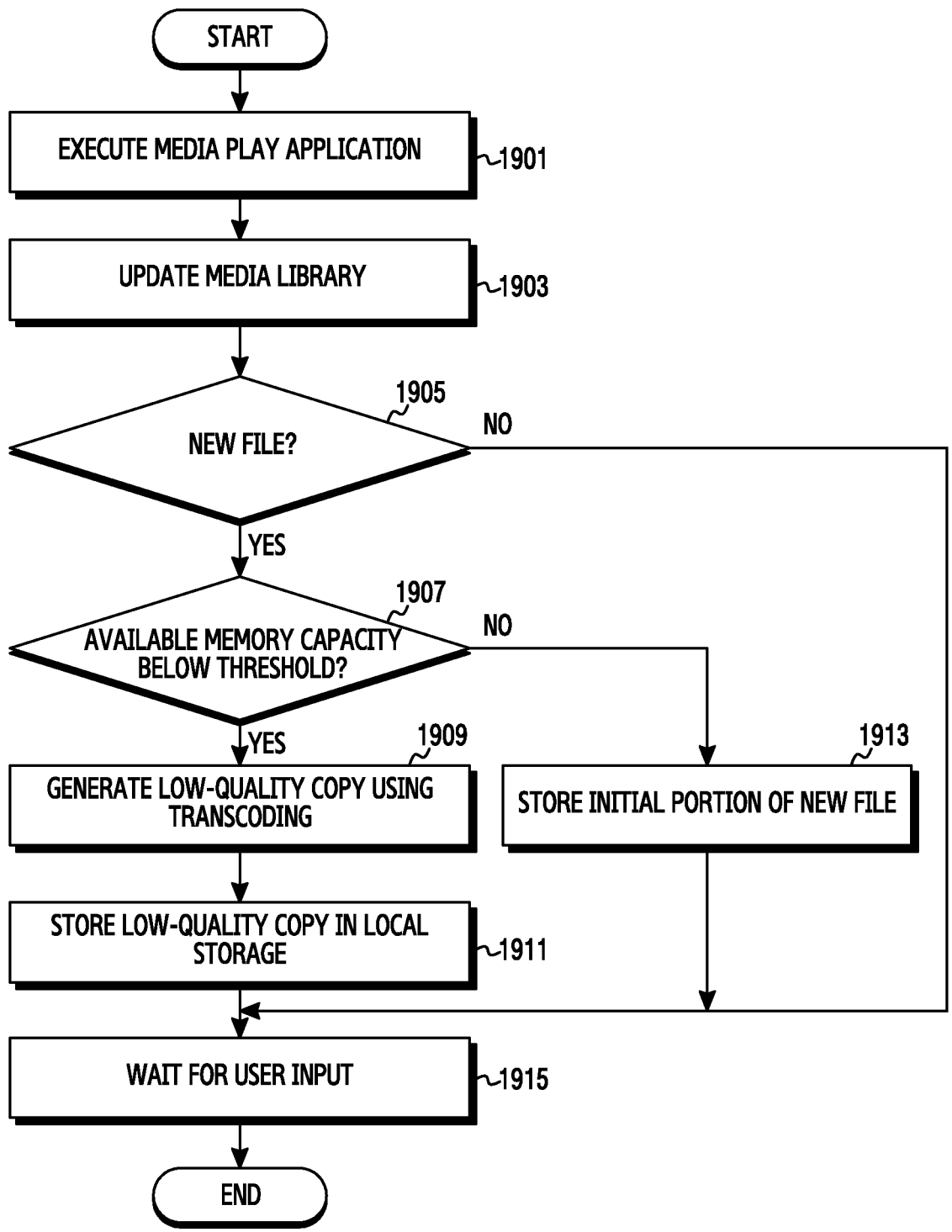
FIG. 19 is a flowchart of a method for processing a streamed file in an electronic device according to an embodiment of the present disclosure.

FIG. 18 is a flowchart of a method for processing a streamed file in an electronic device according to an embodiment of the present disclosure.

FIG. 18 illustrates operations of an electronic device 110 of FIG. 1.

Referring to FIG. 18, in operation 1801, the electronic device downloads a file for the streaming service. That is, the electronic device transmits a request for the file to the external storage and receives the file. For doing so, the electronic device may perform the operations of FIG. 15.

In operation 1803, the electronic device plays the file. The electronic device may concurrently download and seamlessly play the file or file chunks. In more detail, the electronic device decodes the media file and outputs the decoded media through the user interface.

In operation 1805, the electronic device stores a part of the file and deletes the rest of the file. Herein, the stored part of the file may include a qualitative part of the file (e.g., a low-quality copy) or a quantitative part of the file (e.g., the initial portion in the play time).

FIG. 19 is a flowchart of a method for processing a streamed file in an electronic device according to an embodiment of the present disclosure.

FIG. 19 illustrates operations of an electronic device 110 of FIG. 1.

Referring to FIG. 19, the electronic device executes a media play application in operation 1901. The media play application is a program for playing media files stored in the internal storage of the electronic device and media files stored in the external storage. The media play application may be executed by a user's command, but embodiments are not limited thereto. Hence, the selected media file is played.

In operation 1903, the electronic device updates the media library. For example, the electronic device adds metadata of at least one file stored in the external storage, to the media library.

In operation 1905, the electronic device determines whether the played file is a new file. That is, the electronic device determines whether the played file is not stored in the internal storage. For example, the played file may be a file uploaded to the external storage by another device. When the played file is not a new file, the electronic device proceeds to operation 1915. When the played file is a new file, the electronic device proceeds to operation 1907.

In operation 1907, the electronic device determines whether the available memory capacity is below a threshold. That is, the electronic device determines whether the available capacity of the internal storage of the electronic device is below the threshold. When the available memory capacity is below the threshold, the electronic device proceeds to operation 1909. When the remaining memory capacity exceeds the threshold, the electronic device proceeds to operation 1913. That is, the electronic device determines the storage type of the part of the file based on the available memory capacity. According to another embodiment, the electronic device may determine whether a network connection time in the media playback is below a threshold in operation 1907. That is, the network connection time is one basis for determining the type of the part of the file, and may determine whether to support the offline mode. According to yet another embodiment, the electronic device may determine the type of the part of the file on an entirely different basis.

In operation 1909, the electronic device generates a low-quality copy using transcoding. That is, the electronic device generates a copy of relatively lower quality than the played file. Herein, low quality indicates at least one of a low resolution, a data rate per low unit time (e.g., kbps), and a number of frames per low unit time. In operation 1911, the electronic device stores the low-quality copy in the local memory, that is, the internal storage. Hence, even when the network is inaccessible in future, the electronic device may still play the corresponding media.

When the remaining memory capacity exceeds the threshold, the electronic device stores an initial or front portion of the new file in operation 1913. For example, the electronic device extracts data corresponding to the front portion of the file based on the file play time, from the file. Hence, in the next play, the electronic device may commence the media playback using the stored initial or front portion, download a remaining portion from the external storage during the playback of the initial portion, and thus seamlessly play the media.

In operation 1915, the electronic device waits for a user's input. To determine a next operation, the electronic device waits for a command input from the user. In so doing, when the media play application is executed again, the electronic device may repeat the operations.

In FIG. 19, the electronic device streams and seamlessly plays the file, and then stores a part of it. According to another embodiment, the electronic device may store a part of the file before streaming the file. In this case, the electronic device updates the media file library when a cloud media play program or application is executed, and stores the initial portion or the low-quality copy of the file in the internal storage of the electronic device when a media file of which part (e.g., the initial portion or the low-quality copy) is not stored is detected. The electronic device may rapidly store the part of the file using the metadata and the multi-session. In so doing, the type of the part, that is, the initial portion or the low-quality copy may be selected based on system setting or user setting. For example, when the network access time in the user's media play time is below a certain rate, the electronic device may store the low-quality copy.

As such, the electronic device may play the media file stored in the external storage (e.g., the cloud storage). How to play the media file may change depending on whether part of the file is stored in the internal storage, whether the metadata is stored, or when the media file is a new file. Now, the file play method divided by determining whether part of the file and the metadata is stored is explained in regard to FIG. 20.

Figure 20:
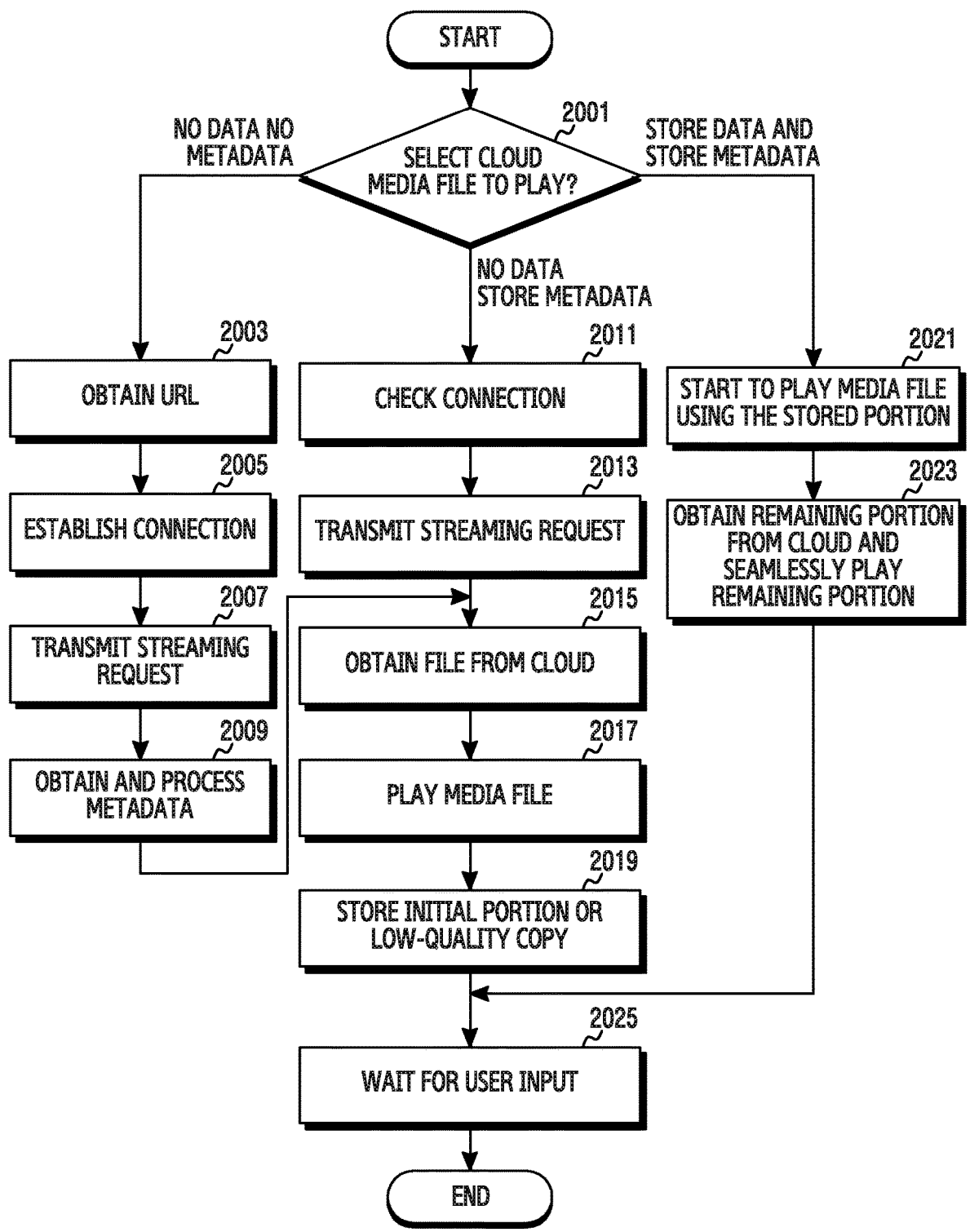
FIG. 20 is a flowchart of a method for playing a file based on stored information in an electronic device according to an embodiment of the present disclosure.

FIG. 20 is a flowchart of a method for playing a file based on stored information in an electronic device according to an embodiment of the present disclosure.

FIG. 20 illustrates operations of an electronic device 110 of FIG. 1.

Referring to FIG. 20, in operation 2001, the electronic device determines whether a cloud media file to play is selected. The media file to play may be selected by the user from files stored in the external storage. The electronic device determines whether metadata and part of the selected file are stored.

When neither the metadata nor the part of the selected file is stored, the electronic device obtains URL information of the selected file in operation 2003. That is, the electronic device requests and receives the metadata including the URL. In operation 2005, the electronic device establishes connection with the cloud storage. In operation 2007, the electronic device transmits a streaming request including information indicating the selected file. In operation 2009, the electronic device obtains and processes the metadata. That is, the electronic device obtains the metadata for the streaming. For example, when the media is audio, the metadata may include a file size for decoding and buffering, and a play time. For example, when the media is video, the metadata may include codec information. The electronic device then proceeds to operation 2015.

When the part of the selected file is not stored, but the metadata of the selected file is stored, the electronic device checks the connection in operation 2011. In operation 2013, the electronic device transmits a streaming request including information indicating the selected file. In operation 2015, the electronic device obtains the file from the cloud. In operation 2017, the electronic device plays the media file. In operation 2019, the electronic device stores part of the media file, that is, an initial portion or a low-quality copy. Hence, the electronic device may use the part of the file in further playbacks. The electronic device then proceeds to operation 2025.

When both of the metadata and the part of the selected file are stored, the electronic device commences the media file playback using the stored portion in operation 2021. In operation 2023, the electronic device obtains the rest or remaining portion of the media file from the cloud and plays the rest or remaining portion following the stored portion playback. In operation 2025, the electronic device waits for a user's input. In so doing, when a media play application is executed again, the electronic device may repeat the operations.

When the electronic device plays a new media file, a part of the file is not pre-stored. Hence, compared with the pre-stored part of the file, a longer delay may occur. However, the electronic device may pre-acquire the part of the new file when the media file to play is known in advance. For example, when playing a plurality of files based on a play list, the electronic device may identify a next media file to play and thus obtain a part of the file in advance. The file playback based on a play list is illustrated in FIG. 21.

Figure 21:
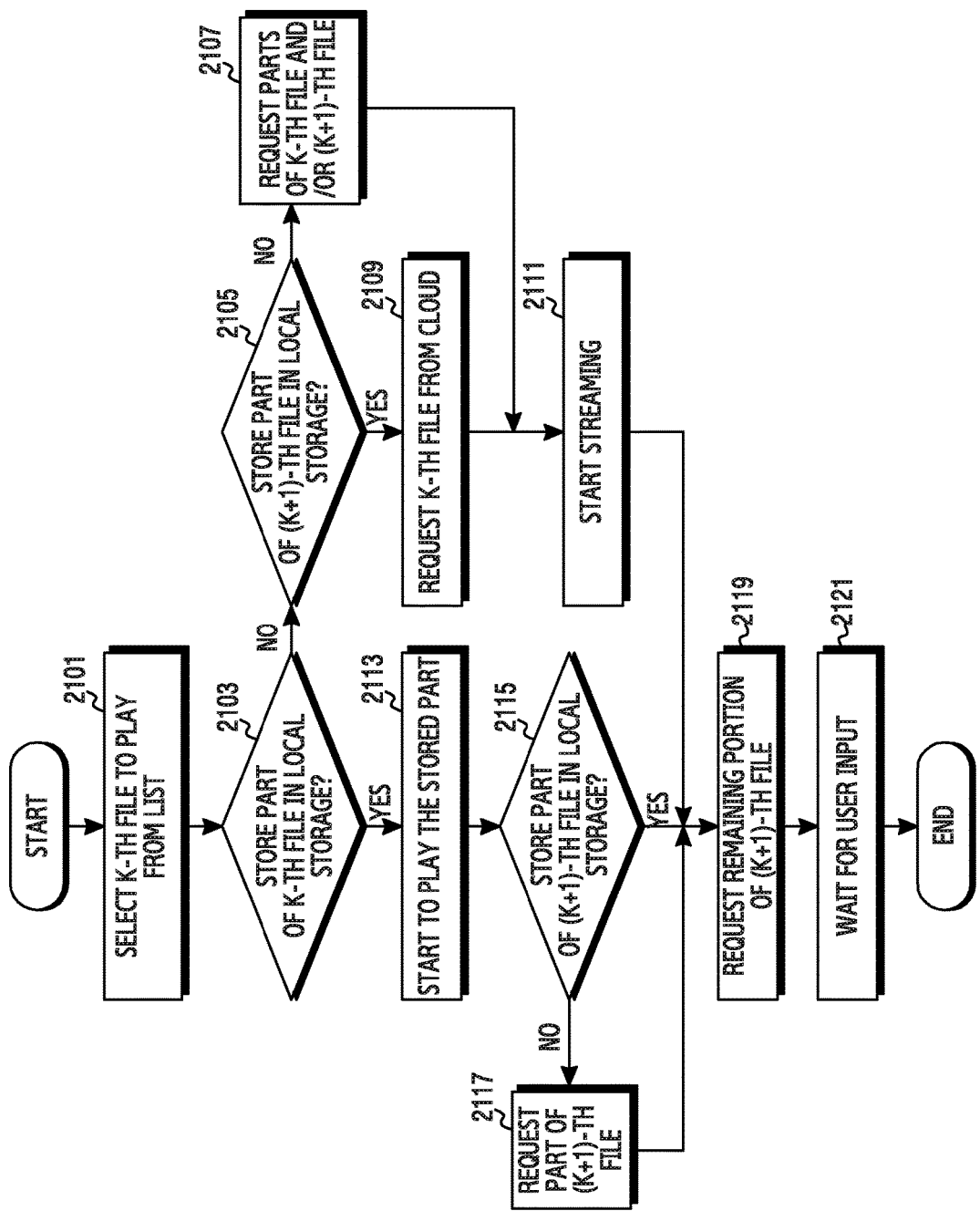
FIG. 21 is a flowchart of a method for playing a file based on a play list in an electronic device according to an embodiment of the present disclosure.

FIG. 21 is a flowchart of a method for playing a file based on a play list in an electronic device according to an embodiment of the present disclosure.

FIG. 21 illustrates operations of an electronic device 110 of FIG. 1.

Referring to FIG. 21, in operation 2101, the electronic device selects a k-th file to play from a play list. In operation 2103, the electronic device determines whether a part of the k-th file (e.g., an initial portion or a low-quality copy) is stored in the local storage, that is, the internal storage of the electronic device. When part of the k-th file is not stored in the local storage, the electronic device determines whether a part of a (k+1)-th file is stored in the local storage of the electronic device in operation 2105. When the part of the (k+1)-th file is not stored in the local storage, the electronic device requests parts of one or both of the k-th file and the (k+1)-th file from the external storage in operation 2107. The electronic device then proceeds to operation 2111.

When the part of the (k+1)-th file in operation 2105 is stored in the local storage, the electronic device requests the k-th file from the cloud, that is, the external storage in operation 2109. In operation 2111, the electronic device commences the streaming. That is, the electronic device downloads and plays the k-th file. The electronic device then proceeds to operation 2119.

When the part of the k-th file is stored in the local storage in operation 2103, the electronic device starts to play the stored part of the k-th file in operation 2113. In operation 2115, the electronic device determines whether the part of the (k+1)-th file is stored in the local storage. When the part of the (k+1)-th file is stored in the local storage, the electronic device proceeds to operation 2119. When the part of the (k+1)-th file is not stored in the local storage, the electronic device requests a part of the (k+1)-th file from the external storage in operation 2117 and proceeds to operation 2119. In operation 2119, the electronic device requests the rest of the (k+1)-th file from the external storage. In operation 2121, the electronic device waits for a user's input. In so doing, when a playlist play application is executed again, the electronic device may repeat the operations.

As such, by storing the part of the file (e.g., the initial portion or the low-quality copy), the electronic device may secure the available capacity of the internal storage. However, when parts of files are accumulated, the electronic device may lack the available capacity due to the parts of the files. Hence, even when storing the parts of the files, the electronic device may store only parts of the files in a limited number. That is, the electronic device may manage a store list of the distributively stored files, and the store list may include files in a limited number or a limited capacity. The store list may be managed as illustrated in FIG. 22.

Figure 22:
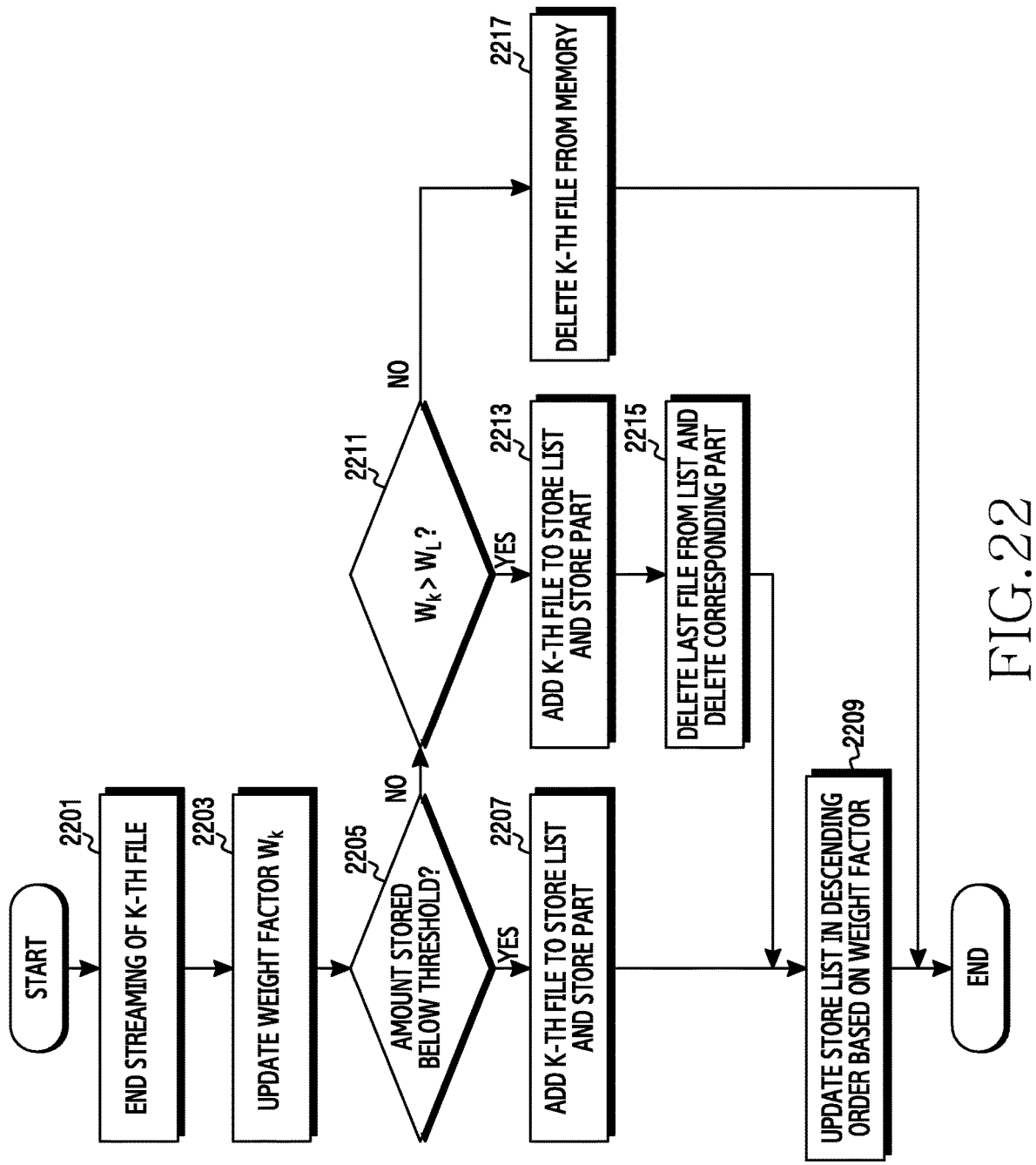
FIG. 22 is a flowchart of a method for managing a store list in an electronic device according to an embodiment of the present disclosure.

FIG. 22 is a flowchart of a method for managing a store list in an electronic device according to an embodiment of the present disclosure.

FIG. 22 illustrates operations of an electronic device 110 of FIG. 1. In FIG. 22, the store list is managed based on a play frequency, an upload timing, and a playback timing, but embodiments are not limited thereto.

Referring to FIG. 22, in operation 2201, the electronic device ends streaming of a k-th file. That is, the electronic device finishes playing the k-th file. Hence, a part of the k-th file is stored. The k-th file is a file uploaded by the electronic device or by another device.

In operation 2203, the electronic device updates a weight factor $W_k$ of the k-th file. The weight factor may be determined based on at least one of the play frequency, the upload timing, and the playback timing. For example, as the play frequency increases, as the upload timing is updated, and as the playback timing is the latest, the weight factor increases. Hence, the electronic device may confirm the number of streaming times, the last streaming time, and the cloud upload time of the k-th file, and determine the weight factor $W_k$.

In operation 2205, the electronic device determines whether a data amount stored in the internal storage is below a threshold. That is, the electronic device determines whether to store the k-th file without deleting other files. According to another embodiment, the electronic device may determine whether to store the k-th file without deleting other files, based on the number of files stored in the internal storage, that is, the number of files in the store list. According to yet another embodiment, the electronic device may determine whether to store the k-th file without deleting other files, based on both the stored data amount and the number of the files. When determining not to store the k-th file without deleting other files, the electronic device considers deleting other files or the k-th file in operation 2211.

When the stored data amount is below the threshold, the electronic device adds the k-th file to the store list and stores a part (e.g., an initial portion or a low-quality copy) of the k-th file in operation 2207.

In operation 2209, the electronic device updates the store list in a descending order based on the weight factor. That is, the electronic device arranges parts of the files of the store list in a descending order of the weight factor.

When the stored data amount exceeds the threshold in operation 2205, the electronic device compares $W_k$ with $W_L$ in operation 2211. $W_L$ indicates a weight factor of the last file in the store list.

When $W_k$ is greater than $W_L$, the electronic device adds the k-th file to the store list and stores the part of the k-th file in operation 2213.

In operation 2215, the electronic device deletes the last file from the list and deletes a part of the last file from the internal storage. The electronic device then proceeds to operation 2209.

If Wk is smaller than or equal to WL in operation 2211, the electronic device deletes the k-th file in operation 2217. According to another embodiment, the electronic device transcodes the part of the k-th file to a low quality. When the part of the transcoded low-quality file is stored and the stored data amount is below the threshold, the electronic device may distributively store the k-th file using a part of the low-quality file. However, when the part of the low-quality file is stored and the stored data amount still exceeds the threshold, the electronic device deletes the k-th file.

Figure 23:
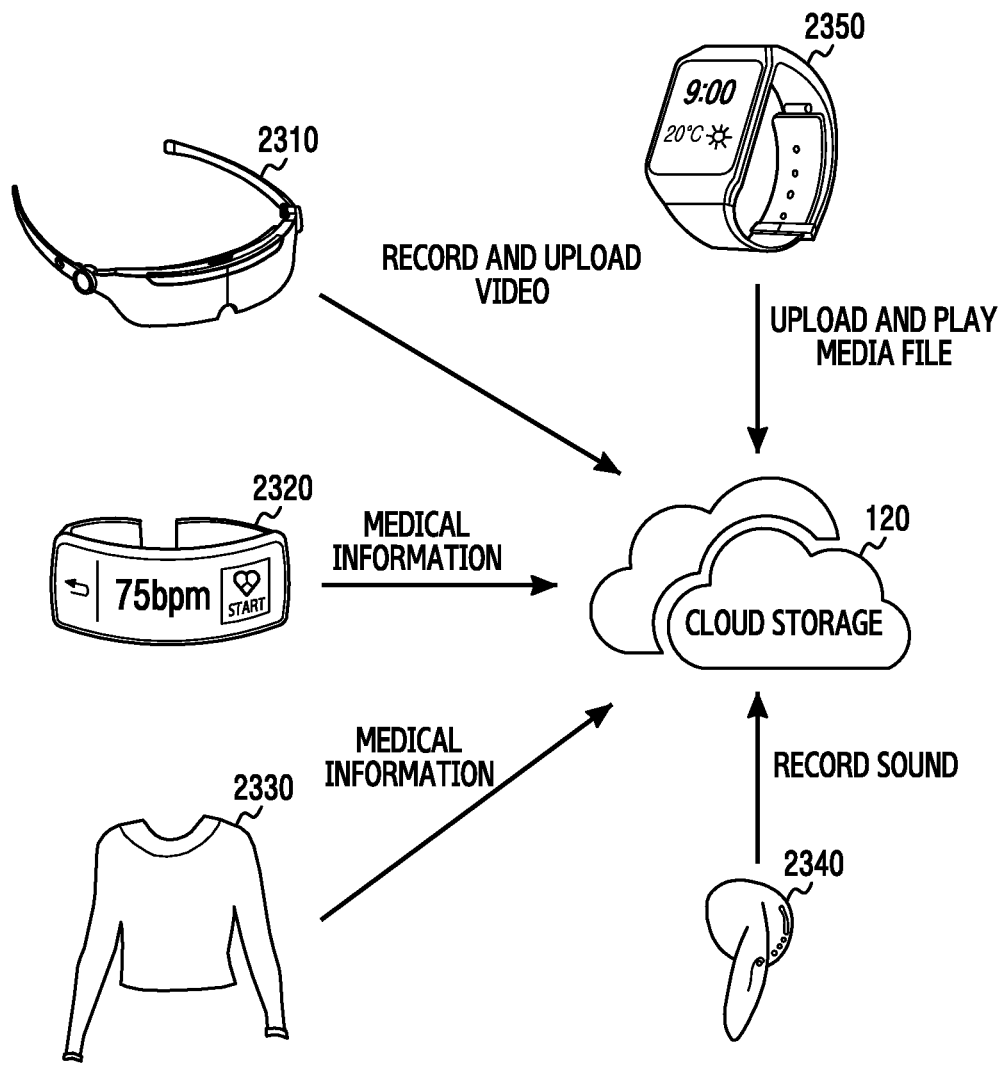
FIGS. 23 to 25 illustrate file management applications according to an embodiment of the present disclosure.
Figure 24:
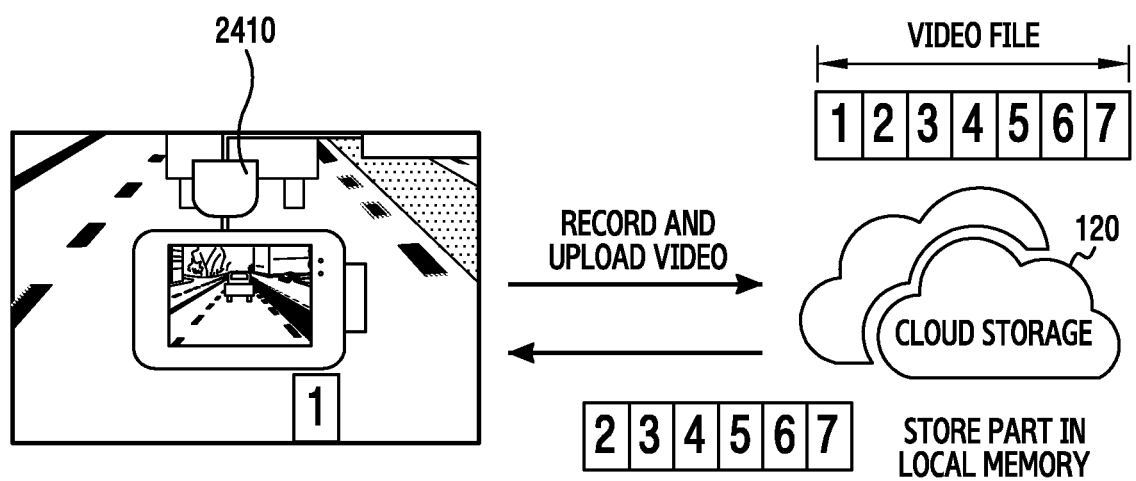
Figure 25:
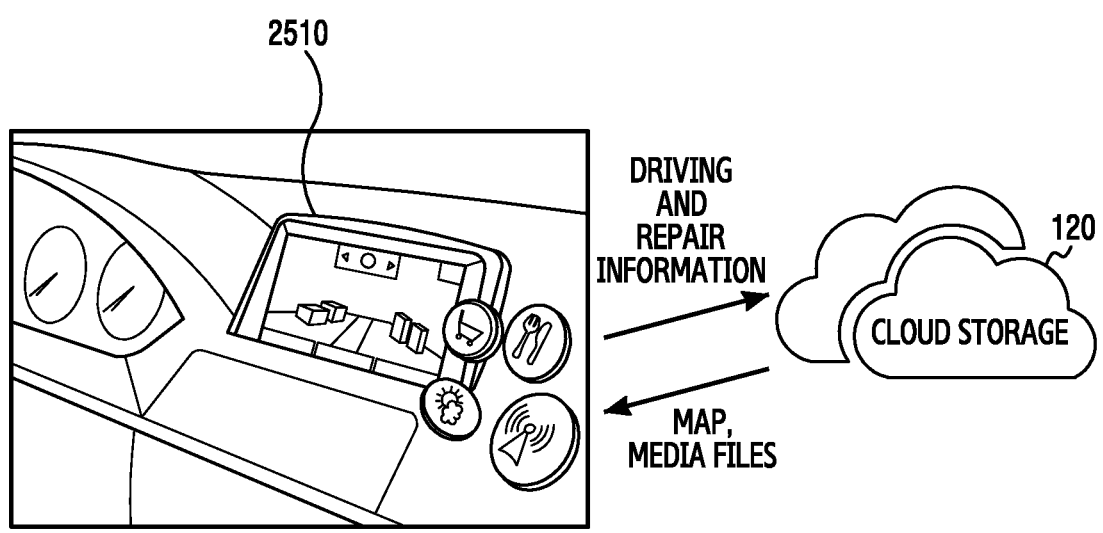

FIGS. 23 to 25 depict file management techniques according to an embodiment of the present disclosure.

Referring to FIG. 23, the file management is applied to various wearable devices. In FIG. 23, an eyeglass-type device 2310 may create a video using a camera and graphic processing device, and upload a file including the video to cloud storage 120. A band-type device 2320 worn on a wrist may generate medical information such as a heart rate and upload a file including the medical information to cloud storage 120. A wear-type device 2330 may generate medical information such as a temperature and upload a file including the medical information to cloud storage 120. A headset-type device 2340 may record sound and upload a file including the sound to cloud storage 120. A watch-type device 2350 may upload its stored media file to cloud storage 120 and play the uploaded media file.

Referring to FIG. 24, the file management is applied to a vehicle black box. In FIG. 24, a black box device 2410 records vehicle driving and creates a video file. The video file is uploaded to cloud storage 120. The black box device 2410 preserves a part (e.g., a first chunk) of the video file. Hence, the black box device 2410 commences the video playback using the part of the video file and downloads the rest of the video file from the cloud storage 120 as described above.

Referring to FIG. 25, the file management is applied to vehicle navigation. In FIG. 25, a navigation device 2510 updates driving and repair information to cloud storage 120. Also, the navigation device 2510 may download map and media files stored in the cloud storage 120.

As set forth above, the electronic device may efficiently use the limited memory.

The embodiments disclosed herein can be implemented through at least one software program running on at least one hardware device and performing management functions to control the elements. The elements include blocks which can be at least one of a hardware device, or a combination of hardware device and software module.

According to various embodiments of the present disclosure, at least part of a device (for example, modules, units or functions thereof) or a method (for example, operations) according to this disclosure, for example, as in a form of a programming module, may be implemented using an instruction stored in non-transitory computer-readable storage media. When at least one processor (for example, the processor 240) execute an instruction, it may perform a function corresponding to the instruction.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a compiler. The hardware device may be configured to operate as at least one software module to perform an operation of various embodiments and vice versa.

A module or programming module according to various embodiments of the present disclosure may include at least one of the above-mentioned components, may not include some of the above-mentioned components, or may further include another component. Operations performed by a module, programming module, or other components according to various embodiments of the present disclosure may be executed through a sequential, parallel, repetitive or heuristic method. Additionally, some operations may be executed in a different order or may be omitted, and other operations may be added. Moreover, the embodiments disclosed in this specification are suggested for the description and understanding of technical content, but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method for operating an electronic device, the method comprising:

transmitting a first file comprising media data to an external storage, the first file including a part of the first file and a remainder of the first file and being stored in a local storage of the electronic device;

determining a time required to completely download and seamlessly play the media data of the first file;

generating, by the electronic device, a second file comprising the part of the first file and excluding the remainder of the first file based on the determined time by adjusting a duration of the second file to have a play time longer than the time required to completely download and seamlessly play the media data using the first file previously transmitted to the external storage;

deleting the first file and storing the second file in the local storage of the electronic device;

playing the media data using the second file stored in the local storage;

receiving the first file from the external storage while playing the second file; and playing the media data using the first file received from the external storage.

2. The method of claim 1, wherein the second file comprises data corresponding to a partial section in a file play time or a low-quality copy of the first file.

3. The method of claim 1, wherein the generating of the second file comprises:

generating the second file comprising a low-quality copy of the first file if an offline mode for the media data is required; and generating the second file comprising data corresponding to a partial section of the first file in a file play time if the offline mode for the first file is not required.

4. The method of claim 1, further comprising:

preserving an original file, if an offline mode for the first file is required and an available capacity of the local storage equals or exceeds a threshold value.

5. The method of claim 1, further comprising:

transmitting the first file to upload the first file when an event occurs, wherein the event is defined based on at least one of a communication state, a battery state, a memory state, or user data of the electronic device.

6. The method of claim 1, further comprising:

receiving a third file from the external storage;

storing a part of the third file in the local storage of the electronic device after playing the third file; and deleting a remainder of the third file excluding the part of the third file.

7. The method of claim 1, further comprising:

receiving a part of a third file which is a next file in a play list from the external storage, while the first file is played.

8. The method of claim 1, further comprising:

determining a weight factor for the first file; and determining whether to store the first file in the local storage based on the weight factor, wherein the weight factor is determined based on at least one of a frequency of playback of the first file, an upload timing of the first file, or a playback timing of the first file.

9. An electronic device comprising:

an internal storage configured to store data;

a communication unit configured to transmit data; and a processor coupled with the internal storage and the communication unit, wherein the processor is configured to:

control to transmit a first file comprising media data to an external storage, the first file including a part of the first file and a remainder of the first file and being stored in the internal storage, determine a time required to completely download and seamlessly play the media data of the first file;

generate a second file comprising the part of the first file and excluding the remainder of the first file based on the determined time by adjusting a duration of the second file to have a play time longer than the time required to completely download and seamlessly play the media data using the first file previously transmitted to the external storage, delete the first file in the internal storage and store the second file in the internal storage, play the media data using the second file stored in the internal storage, receive the first file from the external storage while playing the second file, and play the media data using the first file received from the external storage.

10. The electronic device of claim 9, wherein the second file comprises data corresponding to a partial section in a file play time or a low-quality copy of the first file.

11. The electronic device of claim 10, wherein, if requiring an offline mode for the first file, the processor is further configured to generate the second file comprising a low-quality copy of the first file, and wherein, if not requiring the offline mode for the first file, the processor is further configured to generate the second file comprising data corresponding to a partial section of the first file in a file play time.

12. The electronic device of claim 9, wherein, if an offline mode for the first file is required and an available capacity of the internal storage equals or exceeds a threshold, the processor is further configured to preserve an original file.

13. The electronic device of claim 9, wherein, when an event occurs, the communication unit is further configured to transmit the first file to upload the first file, and wherein the event is defined based on at least one of a communication state, a battery state, a memory state, or user data of the electronic device.

14. The electronic device of claim 9, wherein the processor is further configured to:

receive a third file from the external storage, play the third file, store a part of the third file in the internal storage, and delete a remainder of the third file excluding the part of the third file.

15. The electronic device of claim 14, wherein, if an available capacity of the internal storage is below a threshold, the processor is further configured to generate a fourth file comprising a low-quality copy of the third file, and wherein, if the available capacity of the internal storage equals or exceeds the threshold, the processor is further configured to generate the fourth file comprising data corresponding to the part of the third file in a file play time.

16. The electronic device of claim 14, wherein, to receive the third file, the processor is further configured to:

receive metadata of the third file, establish a connection with the external storage, select the third file, and transmit a streaming request for the third file to the external storage.

17. The electronic device of claim 9, wherein the communication unit is further configured to receive a third file which is a next file in a play list, from the external storage, while the first file is played.

18. The electronic device of claim 9,
   wherein the processor is further configured to:
      determine a weight factor for the first file, and
      determine whether to store the first file in the internal storage based on the weight factor, and
   wherein the weight factor is determined based on at least one of a frequency of playback of the first file, an upload timing of the first file, or a playback timing of the first file.

19. The method of claim 1,
   wherein the determining of the time required to completely download and seamlessly play the media data of the first file is performed at a time that the first file is uploaded,
   wherein the determining of the time required to completely download and seamlessly play the media data of the first file is based on information extracted from a header of a media file, and
   wherein the time required to completely download and seamlessly play the media data of the first file is based on the time required to completely download the media data of the first file, a decoding time, and a time margin.

* * * * *